US012726711B2

(12) United States Patent
Xing et al.

(10) Patent No.: US 12,726,711 B2
(45) Date of Patent: Sep. 1, 2026

(54) ELECTRONIC DEVICE AND METHOD FOR PERFORMING BRIGHTNESS ADJUSTMENT

(71) Applicant: SAMSUNG ELECTRONICS CO., LTD., Suwon-si (KR)

(72) Inventors: Xiaoxia Xing, Beijing (CN); Zikun Liu, Beijing (CN); Jianxing Zhang, Beijing (CN); Juan Lei, Beijing (CN); Xiangyu Kong, Beijing (CN); Daul Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 86 days.

(21) Appl. No.: 18/781,570

(22) Filed: Jul. 23, 2024

(65) Prior Publication Data

US 2025/0175708 A1 May 29, 2025

Related U.S. Application Data

(63) Continuation of application No. PCT/KR2024/009883, filed on Jul. 10, 2024.

(30) Foreign Application Priority Data

Nov. 24, 2023 (CN) ........................ 202311585420.6

(51) Int. Cl.
*H04N 23/71* (2023.01)
*G06T 5/40* (2006.01)
(Continued)

(52) U.S. Cl.
CPC ............... *H04N 23/71* (2023.01); *G06T 5/40* (2013.01); *G06T 5/92* (2024.01); *H04N 23/76* (2023.01); *G06T 2207/20092* (2013.01)

(58) Field of Classification Search
CPC .......... H04N 23/71; H04N 23/76; G06T 5/40; G06T 5/92; G06T 2207/20092
See application file for complete search history.

(56) References Cited

U.S. PATENT DOCUMENTS 9,369,684 B2 6/2016 Lim et al.
10,114,532 B2 10/2018 Krishnaswamy et al.
(Continued)

FOREIGN PATENT DOCUMENTS

CN 106484356 A 3/2017
CN 107302663 A 10/2017
(Continued)

OTHER PUBLICATIONS

Chunle Guo et al., "Zero-Reference Deep Curve Estimation for Low-Light Image Enhancement", Proceedings of 2020 IEEE/CVF Conference on Computer Vision and Pattern Recognition (CVPR), 10 pages, arXiv:2001.06826v2 [cs.CV] (Mar. 22, 2020).
(Continued)

*Primary Examiner* — Gevell V Selby
(74) *Attorney, Agent, or Firm* — Sughrue Mion, PLLC

(57) ABSTRACT

A method performed by an electronic device, may include: acquiring image brightness information of a first image and scene brightness information of a shooting scene corresponding to the first image; and performing brightness adjustment on the first image based on the image brightness information and the scene brightness information.

20 Claims, 29 Drawing Sheets

(51) Int. Cl.

| | |
|---|---|
| ***G06T 5/92*** | (2024.01) |
| ***H04N 23/76*** | (2023.01) |

(56) References Cited

U.S. PATENT DOCUMENTS

| | | | | |
|---|---|---|---|---|
| 10,297,057 | B2 | 5/2019 | Hasegawa et al. | |
| 2006/0039017 | A1* | 2/2006 | Park | H04N 9/73 358/1.9 |
| 2018/0205865 | A1 | 7/2018 | Xie et al. | |
| 2020/0045218 | A1* | 2/2020 | Rathour | H04N 23/74 |
| 2020/0374447 | A1* | 11/2020 | Lu | H04N 23/88 |
| 2021/0250564 | A1 | 8/2021 | Pieri et al. | |
| 2023/0353880 | A1* | 11/2023 | Kadoi | H04N 23/71 |

FOREIGN PATENT DOCUMENTS

| | | | |
|---|---|---|---|
| CN | 115797199 | A | 3/2023 |
| JP | 8-129641 | A | 5/1996 |
| JP | 2016-63323 | A | 4/2016 |
| WO | 2022/096013 | A1 | 5/2022 |

OTHER PUBLICATIONS

Sean Moran et al., “DeepLPF: Deep Local Parametric Filters for Image Enhancement”, Proceedings of 2020 IEEE/CVF Conference on Computer Vision and Pattern Recognition (CVPR), 10 pages, arXiv:2003.13985v1 [cs.CV] (Mar. 31, 2020).

International Search Report (PCT/ISA/210) and Written Opinion (PCT/ISA/237) issued by the International Searching Authority on Oct. 16, 2024 in corresponding International Application No. PCT/KR2024/009883.

* cited by examiner

Figure 2:
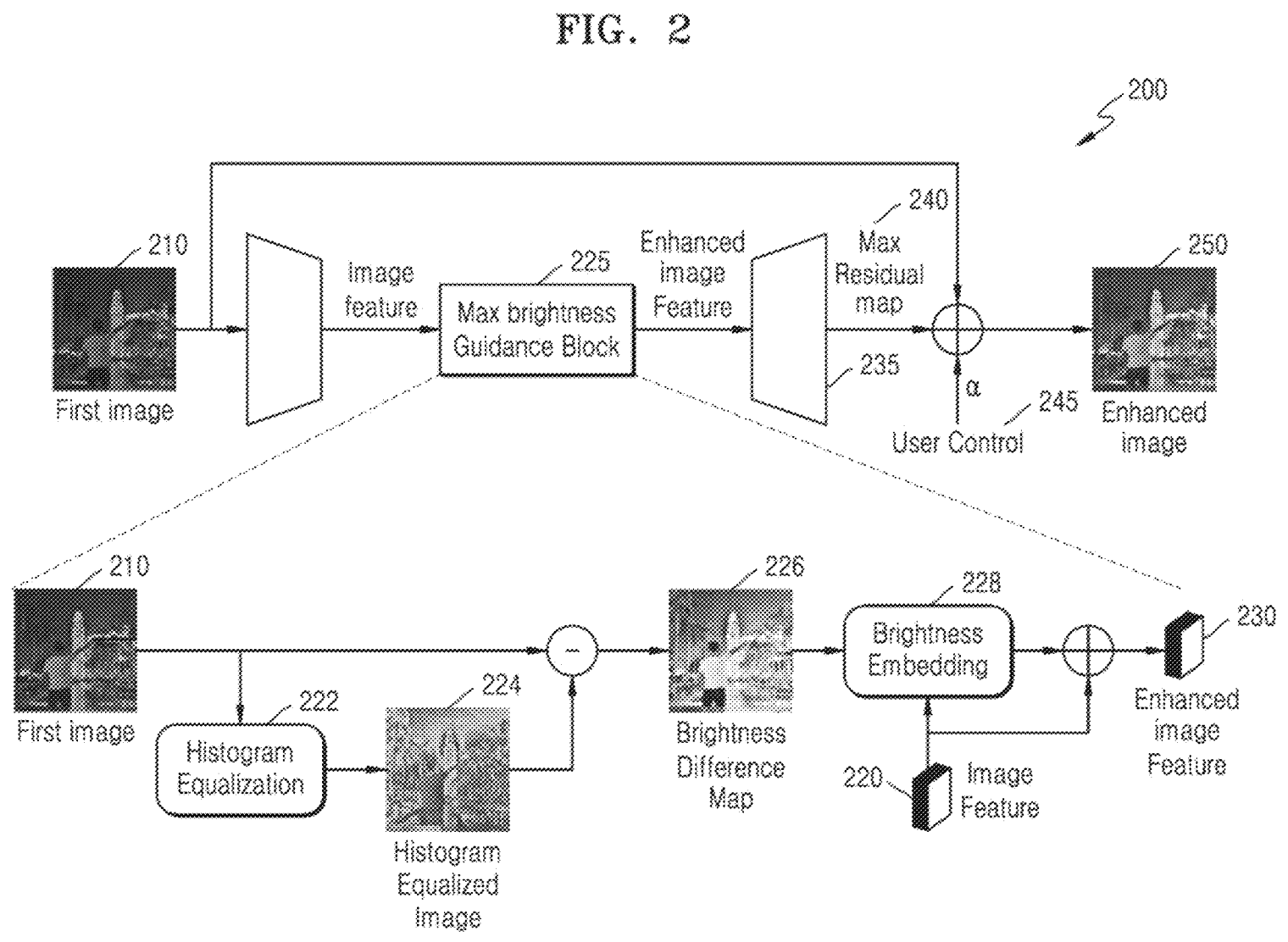

210
First image image feature

225
Max brightness Guidance Block

Enhanced image Feature

235

240
Max Residual map

α

245
User Control

250
Enhanced image

210
First Image

222
Histogram Equalization

224
Histogram Equalized Image

−

226
Brightness Difference Map

228
Brightness Embedding

220
Image Feature

230
Enhanced image Feature

FIG. 3

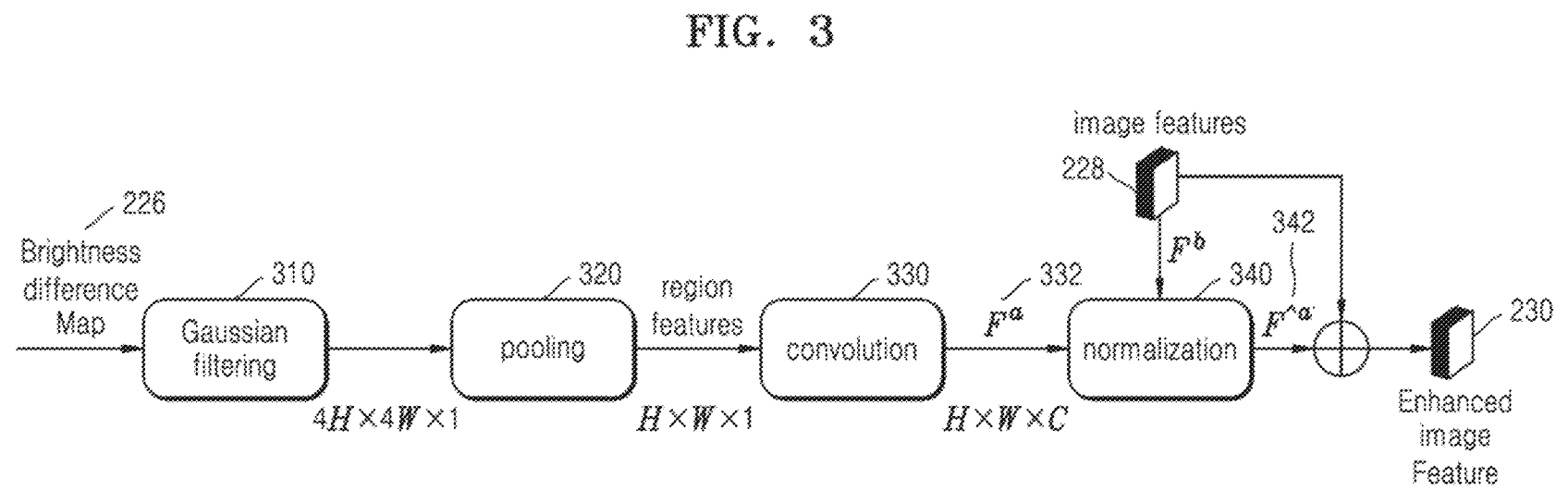

226
Brightness difference Map
310
Gaussian filtering
$4H \times 4W \times 1$
320
pooling
region features
$H \times W \times 1$
330
convolution
332
$F^a$
$H \times W \times C$
228
image features
$F^b$
340
normalization
342
$F'^a$
230
Enhanced image Feature

FIG. 4

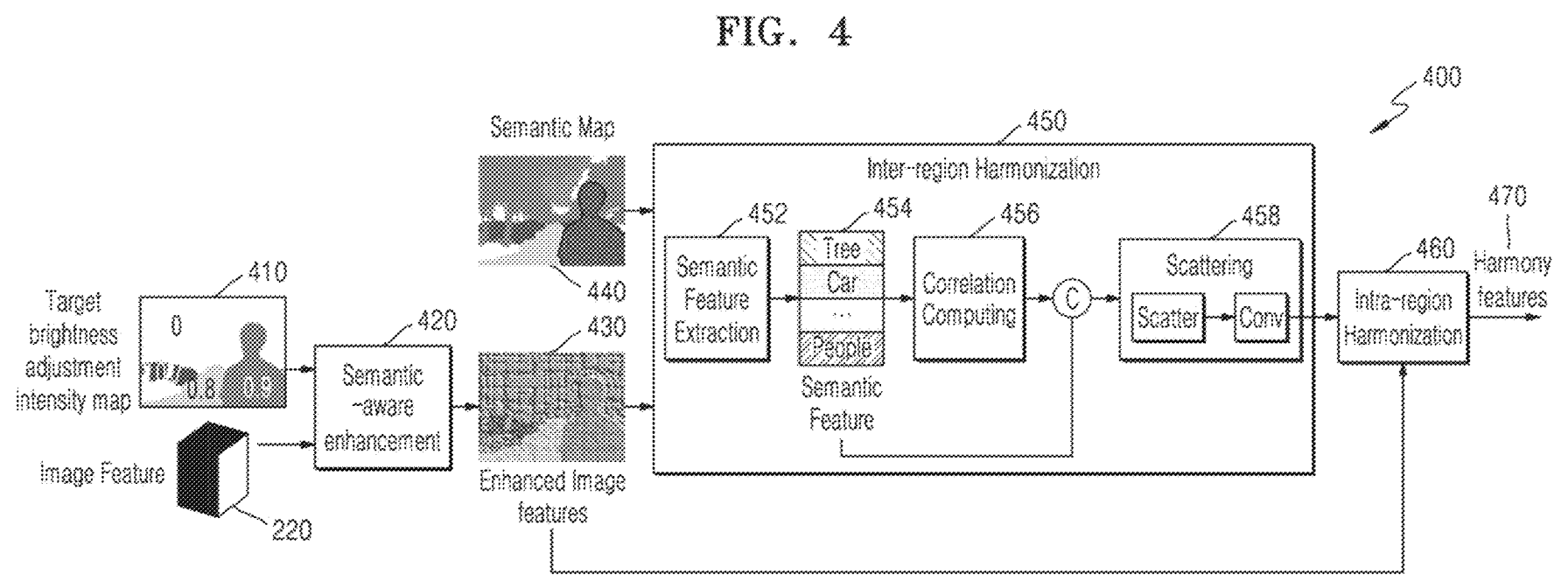

400
Target brightness adjustment intensity map
410
0
0.8
Image Feature
220
Semantic -aware enhancement
420
Semantic Map
440
430
Enhanced Image features
450
Inter-region Harmonization
452
Semantic Feature Extraction
454
Tree
Car
...
People
Semantic Feature
456
Correlation Computing
C
458
Scattering
Scatter
Conv
460
Intra-region Harmonization
470
Harmony features

Figure 5:
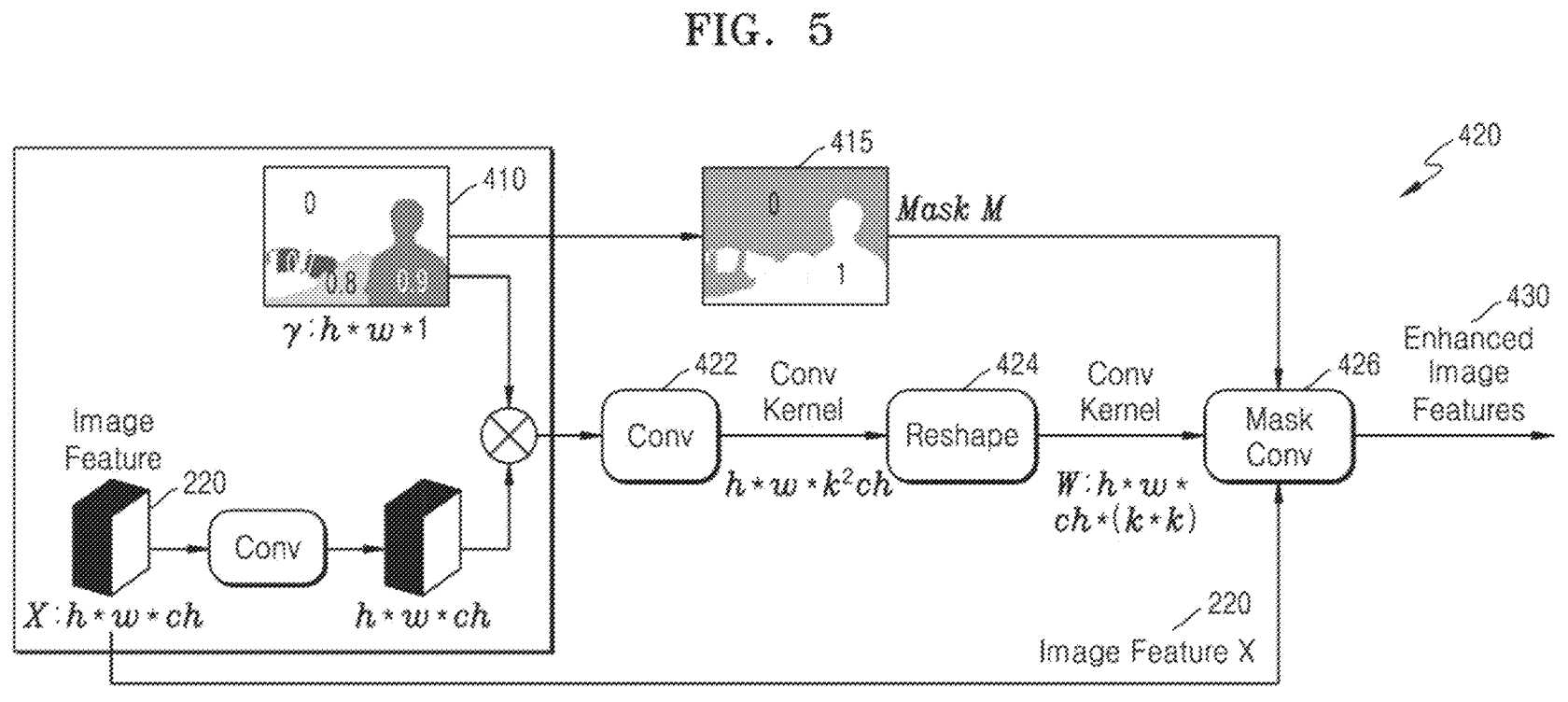

430 Enhanced Image Features

426 Mask Conv

Mask M

415

0

1

424 Reshape

Conv Kernel $W: h*w*ch*(k*k)$

422 Conv

Conv Kernel $h*w*k^2ch$

220 Image Feature X

410

0

0.8

0.9

$\gamma: h*w*1$ $h*w*ch$

Conv

220 Image Feature $X: h*w*ch$ 456
910
929
X''
k * ch
928
Corrected Attention Map
k * k
softmax
922
924
925
V
K
Q
919
X'
918
Attention Map
912
914
916
X
454

Figure 15:
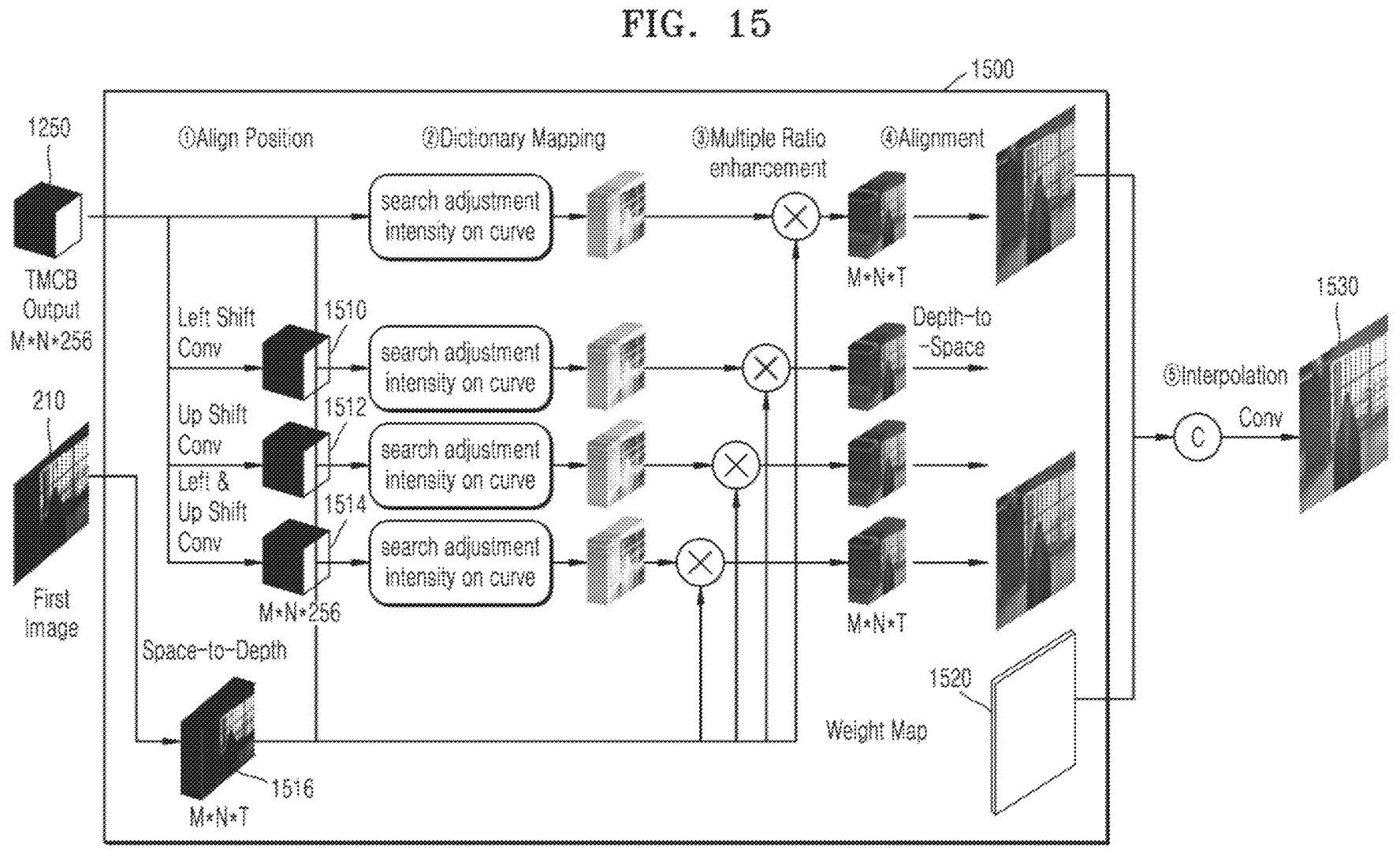

①Align Position

②Dictionary Mapping

③Multiple Ratio enhancement

④Alignment

⑤Interpolation

Conv

C

1530

1250

TMCB Output M*N*256

210

First Image

Left Shift Conv

Up Shift Conv

Left & Up Shift Conv

1510

1512

1514

M*N*256 search adjustment intensity on curve search adjustment intensity on curve search adjustment intensity on curve search adjustment intensity on curve

M*N*T

M*N*T

Depth-to-Space

Space-to-Depth

1516

M*N*T

1520

Weight Map

FIG. 16

Figure 21:
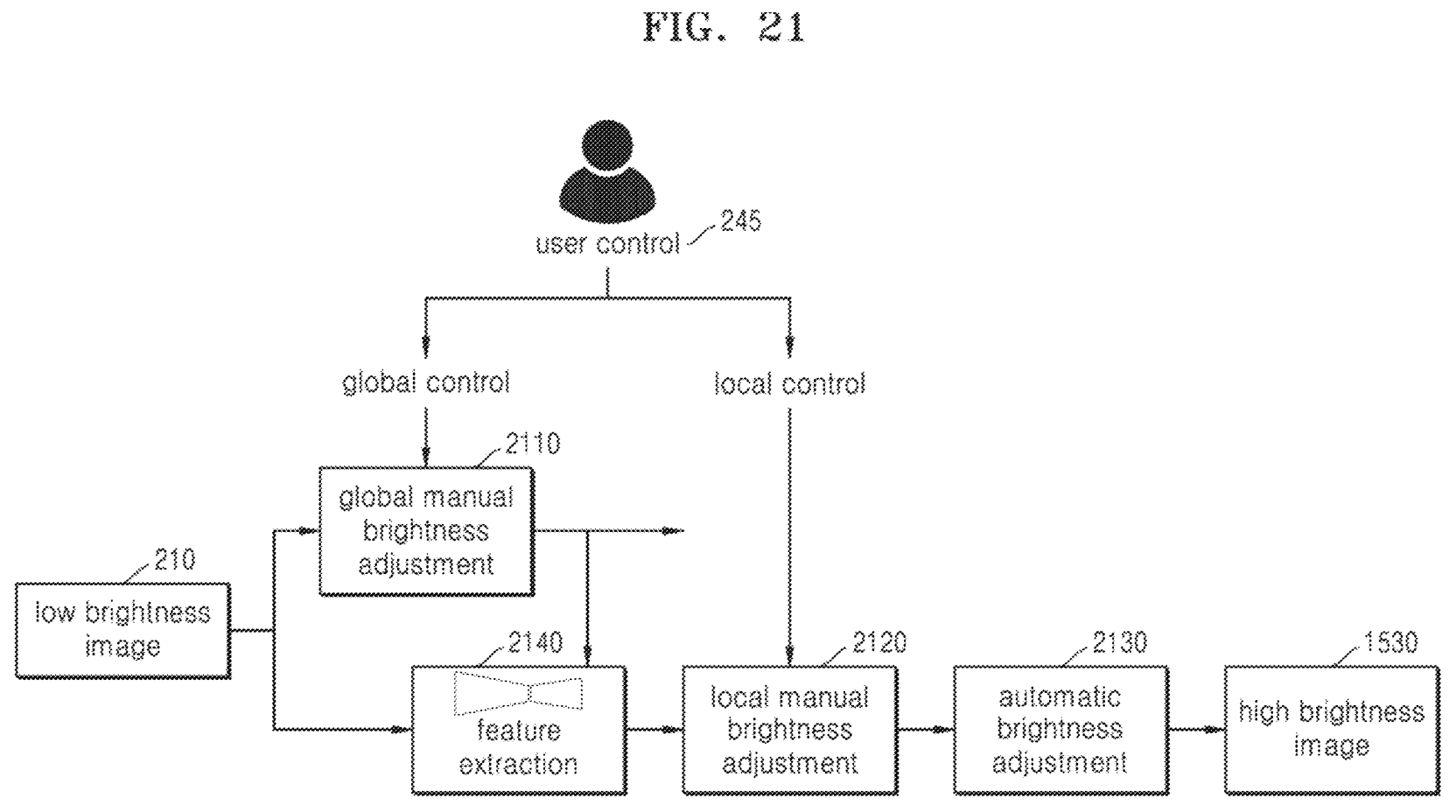

FIG. 21 user control
245
global control
local control
210
low brightness image
2110
global manual brightness adjustment
2140
feature extraction
2120
local manual brightness adjustment
2130
automatic brightness adjustment
1530
high brightness image

FIG. 26

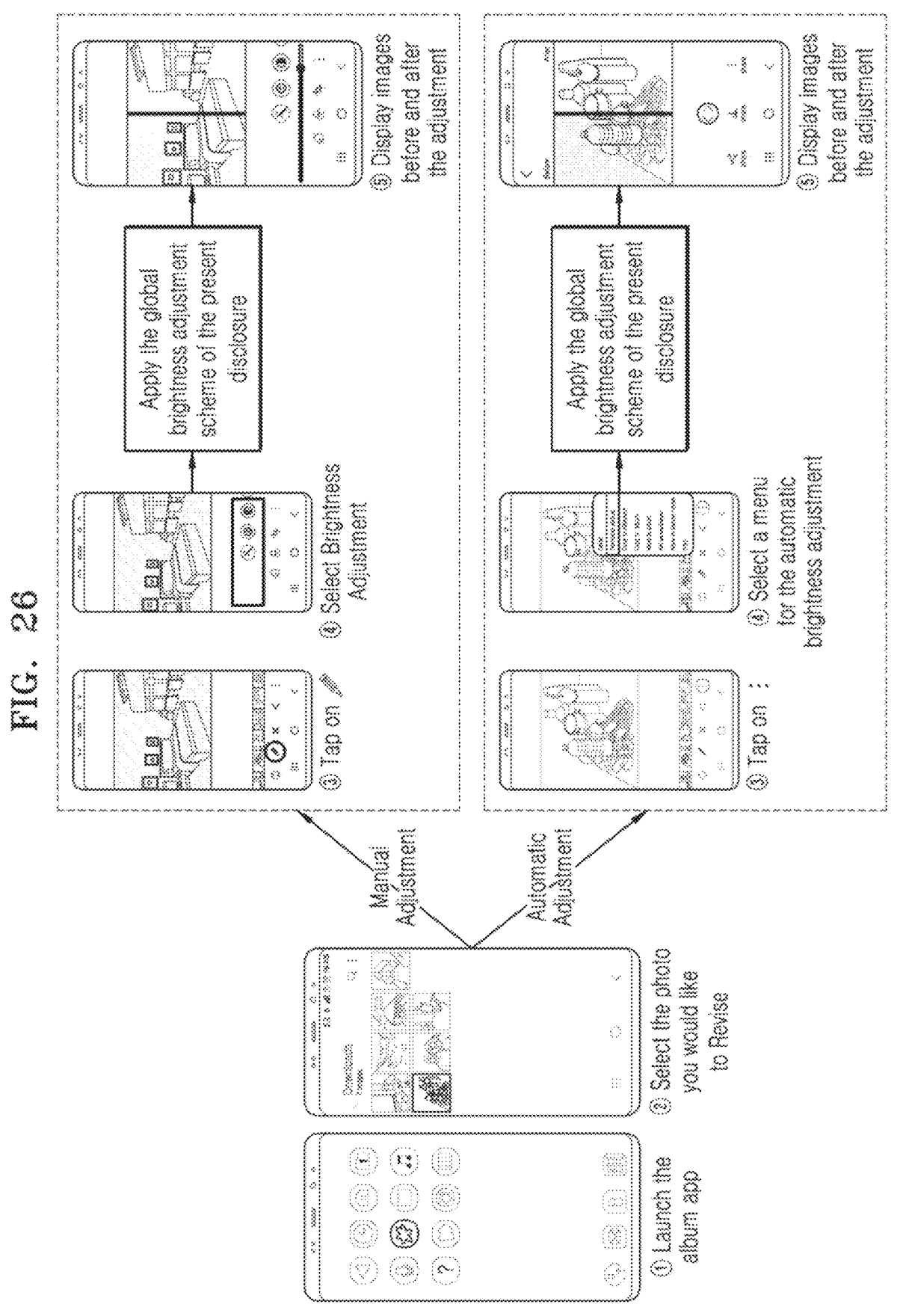

① Launch the album app

② Select the photo you would like to Revise

Manual Adjustment

Automatic Adjustment

③ Tap on

④ Select Brightness Adjustment

Apply the global brightness adjustment scheme of the present disclosure

⑤ Display images before and after the adjustment

③ Tap on ⋮

④ Select a menu for the automatic brightness adjustment

Apply the global brightness adjustment scheme of the present disclosure

⑤ Display images before and after the adjustment

ELECTRONIC DEVICE AND METHOD FOR PERFORMING BRIGHTNESS ADJUSTMENT

CROSS-REFERENCE TO RELATED APPLICATIONS

This application is a continuation application, claiming priority under § 365(c), of an International application No. PCT/KR2024/009883, filed on Jul. 10, 2024, which is based on and claims the benefit of a Chinese patent application number 202311585420.6, filed on Nov. 24, 2023, in the China National Intellectual Property Administration, the disclosure of each of which is incorporated by reference herein in its entirety.

BACKGROUND

1. Field

The present disclosure relates to an image processing field. Specifically, the disclosure relates to a method performed by an electronic device, an electronic device, and a computer-readable storage medium.

2. Description of Related Art

As users demand higher and higher image quality, better image brightness adjustment technology is needed. Adjustable brightness correction is an advanced image quality improvement function, which may include: manual image brightness adjustment and automatic image brightness adjustment, providing users with higher freedom of image brightness adjustment and better experience. However, the image quality obtained by the current image brightness adjustment scheme still struggles to meet users' needs.

SUMMARY

According to an embodiment, a method performed by an electronic device, may include acquiring image brightness information of a first image and scene brightness information of a shooting scene corresponding to the first image. The method may include performing brightness adjustment on the first image based on the image brightness information and the scene brightness information.

According to an embodiment, an electronic device may include a memory storing one or more instructions. The electronic device may include at least one processor coupled to the memory. The at least processor may be configured to execute one or more instructions stored in the memory to cause the electronic device to acquire image brightness information of a first image and scene brightness information of a shooting scene corresponding to the first image. The at least processor may be configured to execute one or more instructions stored in the memory to cause the electronic device to perform brightness adjustment on the first image based on the image brightness information and the scene brightness information.

According to an embodiment, a computer readable storage medium storing instructions that, when executed by at least one processor, cause the at least one processor to perform a method.

According to the technical solution provided by one or more embodiments of the present disclosure, since the image brightness information of the first image and the scene brightness information of a shooting scene corresponding to the first image are acquired, and the brightness adjustment is performed on the first image based on the image brightness information and the scene brightness information, the brightness adjusted image can be made to be more suitable for the corresponding scene, and the quality of the brightness adjusted image is improved.

According to the technical solution provided in one or more embodiments of the present disclosure, since the maximum brightness adjustment intensity parameter corresponding to the first image is determined based on the brightness statistical information of the first image, and the brightness adjustment is performed on the first image based on the maximum brightness adjustment intensity parameter and the target brightness adjustment intensity, it is possible to make the brightness adjustment to performed within the range of the maximum brightness adjustment intensity parameter determined based on the brightness statistical information, so that different brightness regions in the image can obtain appropriate brightness enhancement, which improves the quality of the brightness adjusted image.

According to the technical solution provided in one or more embodiments of the present disclosure, since after the brightness adjustment of the target local region in the first image based on the target brightness adjustment intensity, the correlation between the semantic features of the respective semantic categories in the first image is acquired, and the brightness adjustment is performed for the other local regions of the first image except the target local region based on the correlation, it is possible to reduce the disharmony phenomenon between the target local region and the other local regions after brightness adjustment of the target local region, which makes the adjusted image more natural and improves the quality of the brightness adjusted image.

According to the technical solution provided in one or more embodiments of the present disclosure, since the brightness adjustment is first performed on the first image based on the target brightness adjustment intensity, and subsequently, in response to detecting the brightness adjustment performed on the first image based on the target brightness adjustment intensity is finished, the brightness adjustment is performed on the first image based on the image brightness information of the first image and the scene brightness information of the shooting scene to which the first image corresponds, it is possible to obtain a brightness enhanced image with a higher quality with fewer user operations.

It should be understood that the above general descriptions and the following detailed descriptions are only illustrative and explanatory, and do not limit the present disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates an example of a global brightness adjustment framework according to an embodiment of the present disclosure;

FIG. 3 is a schematic diagram illustrating brightness embedding according to an embodiment of the present disclosure;

FIG. 4 is a schematic diagram illustrating an example of local brightness adjustment according to an embodiment of the present disclosure;

FIG. 5 is a schematic diagram illustrating semantic awareness enhancement according to an embodiment of the present disclosure;

FIG. 15 is a schematic diagram of operations of a brightness mapping and curve interpolation block according to an embodiment of the present disclosure;

FIG. 16 is a schematic diagram illustrating curve interpolation according to an embodiment of the present disclosure;

FIG. 21 is a schematic diagram illustrating an example of an image brightness adjustment architecture according to an embodiment of the present disclosure;

FIG. 26 is a schematic diagram of an operation of using a brightness adjustment scheme according to an embodiment of the present disclosure in an album application;

DETAILED DESCRIPTION

Figure 1:
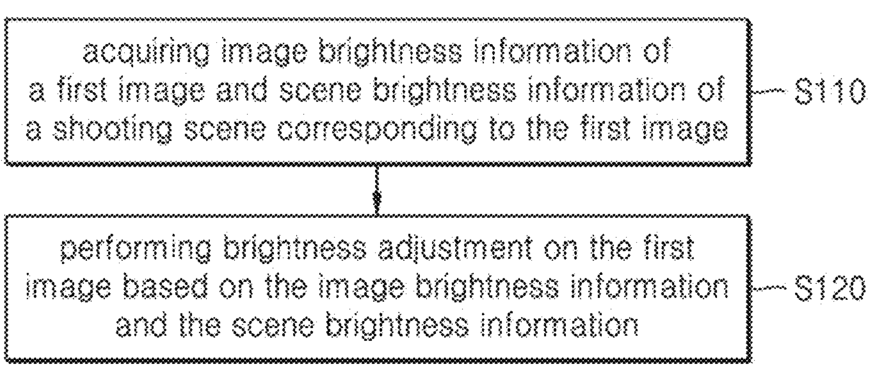
FIG. 1 is a flowchart illustrating a method performed by an electronic device according to an embodiment of the present disclosure.

The description is provided below with reference to the accompanying drawings to facilitate comprehensive understanding of various embodiments of the present disclosure as defined by the claims and the equivalents thereof. This description includes various specific details to help with understanding but should only be considered illustrative. Consequently, those ordinarily skilled in the art will realize that various embodiments described here can be varied and modified without departing from the scope and spirit of the present disclosure. In addition, the description of function and structure of the common knowledge can be omitted for clarity and conciseness.

The terms and expressions used in the claims and the description below are not limited to their lexicographical meaning but are used only by the inventor to enable the clear and consistent understanding of the present disclosure. Therefore, it should be apparent to those skilled in the art that the following description of the various embodiments of the present disclosure is provided only for the purpose of the illustration without limiting the present disclosure as defined by the appended claims and their equivalents.

It will be understood that, unless specifically stated, the singular forms "one", "a", and "the" used herein may also include the plural form. Thus, for example, "component surface" refers to one or more such the surfaces. When we state that one element is "connected" or "coupled" to another element, the one element may be directly connected or coupled to the another element, or it may mean that a connection relationship between the one element and the another element is established through an intermediate element. In addition, "connect" or "couple" used herein may include a wireless connection or wireless coupling.

The terms "includes" and "may include" mean the presentation of the corresponding disclosed functions, operations, or components that can be used in various embodiments of the present disclosure, but do not limit the presentation of one or more additional functions, operations, or features. In addition, it should be understood that the terms "including" or "having" may be interpreted to mean certain features, numbers, steps, operations, components, assemblies or combinations thereof, but should not be interpreted to exclude the possibility of the existence of one or more of other features, numbers, steps, operations, components, assemblies and/or combinations thereof.

The term "or" used in various embodiments of the disclosure herein includes any listed term and all combinations thereof. For example, "A or B" may include A, or include B, or include both A and B. When a plurality of (two or more) items are described, if a relationship between the plurality of items is not clearly defined, "between the plurality of items" may refer to one, some or all of the plurality of items. For example, for a description "a parameter A includes A1, A2, A3", it may be implemented that the parameter A includes A1, or A2, or A3, and it may also be implemented that the parameter A includes at least two of the three parameters A1, A2, A3.

It should be appreciated that the blocks in each flowchart and combinations of the flowcharts may be performed by one or more computer programs which include computer-executable instructions. The entirety of the one or more computer programs may be stored in a single memory or the one or more computer programs may be divided with different portions stored in different multiple memories.

Unless defined differently, all terms as used in the present disclosure (including technical or scientific terms) have the same meanings as understood by those skilled in the art as described in the present disclosure. As common terms defined in dictionaries are interpreted to have meanings consistent with those in the context in the relevant technical field, and they should not be idealized or overly formalized unless expressly defined as such in the present disclosure.

At least some of the functions in the device or electronic apparatus provided in the embodiments of the disclosure may be implemented through an AI model, for example, at least one module among a plurality of modules of the device or electronic apparatus may be implemented through the AI model. Functions associated with AI may be performed by a non-volatile memory, a volatile memory, and processors.

A processor may include one or more processors. At this time, the one or more processors may be a general-purpose processor, such as a central processing unit (CPU), an application processor (AP), etc., or a processor used only for graphics, such as, a graphics processing unit (GPU), a visual processing unit (VPU), and/or an AI dedicated processor (such as, a neural processing unit (NPU).

The one or more processors control the processing of input data according to predefined operation rules or AI models stored in a non-volatile memory and a volatile memory. The predefined operation rules or AI models may be provided through training or learning.

Here, providing by learning means that the predefined operation rules or AI models with desired characteristics is obtained by applying a learning algorithm to a plurality of learning data. The learning may be performed in the device or the electronic apparatus itself executing AI according to the embodiment, and/or may be implemented by a separate server/system.

The AI models may include a plurality of neural network layers. Each layer includes a plurality of weight values, and performs a neural network calculation by performing a calculation between the input data of this layer (for example, the calculation results of the previous layer and/or the input data of the AI model) and the plurality of weight values of the current layer. Examples of the neural network include, but are not limited to, a convolution neural network (CNN), a depth neural network (DNN), a recurrent neural network (RNN), a restricted Boltzmann machine (RBM), a depth confidence network (DBN), a bidirectional recursive depth neural network (BRDNN), a generative countermeasure network (GAN), and a depth Q network.

A learning algorithm is a method that uses a plurality of learning data to train a predetermined target apparatus (for example, a robot) to enable, allow, or control the target apparatus to make a determination or prediction. Examples of the learning algorithm include, but are not limited to, supervised learning, unsupervised learning, semi supervised learning, or reinforcement learning.

According to the present disclosure, at least one step of a method performed by a user equipment, such as the step of determining a maximum brightness adjustment intensity parameter, performing brightness adjustment on a first image based on image brightness information and scene brightness information, may be implemented using an artificial intelligence model. The processor of the electronic apparatus may perform preprocessing operations on data to convert it into a form suitable for use as input to artificial intelligence models. The artificial intelligence models may be obtained through training. Here, "obtained through training" refers to training a basic artificial intelligence model with a plurality of training data through a training algorithm to obtain the predefined operation rules or artificial intelligence models, which are configured to perform the required features (or purposes).

Below, the technical solutions of the embodiments of the disclosure and the technical effects produced by the technical solutions of the disclosure will be explained by describing several optional embodiments. It should be pointed out that the following implementations can be mutually referenced, drawn, or combined, and for the same terms, similar features, and similar implementation steps in different implementations, they will not be repeated.

FIG. 1 is a flowchart illustrating a method performed by an electronic device according to an embodiment of the present disclosure.

As shown in FIG. 1, at step S110, image brightness information of a first image and scene brightness information of a shooting scene corresponding to the first image are acquired.

As an example, the first image herein may directly be an image acquired by the user, or may be an image acquired by performing process on the image acquired by the user, for example, the first image may be an image acquired by performing manual global brightness adjustment and/or local brightness adjustment on the first image. Thus, the method shown in FIG. 1 may include performing global brightness adjustment and/or local brightness adjustment on the first image. For example, the method shown in FIG. 1 may include: detecting a target brightness adjustment intensity input by the user; and performing brightness adjustment on the first image based on the target brightness adjustment intensity. In an embodiment, the target brightness adjustment intensity may be a brightness adjustment intensity corresponding to a global region of the first image, at this time the global brightness adjustment is performed on the first image. In an embodiment, the target brightness adjustment intensity may be a brightness adjustment intensity corresponding to a target local region in the first image, at this time the local brightness adjustment is performed on the first image.

In the following, the global brightness adjustment and the local brightness adjustment according to an embodiment of the present disclosure are described.

According to an embodiment, in the case that the target brightness adjustment intensity is the brightness adjustment intensity corresponding to the global region of the first image, the performing of the brightness adjustment on the first image based on the target brightness adjustment intensity, may include: acquiring brightness statistical information of the first image; determining a maximum brightness adjustment intensity parameter corresponding to the first image according to the brightness statistical information; performing the brightness adjustment on the first image based on the maximum brightness adjustment intensity parameter and the target brightness adjustment intensity. Since the maximum brightness adjustment intensity parameter corresponding to the first image is determined according to the brightness statistical information of the first image, and the brightness adjustment is performed on the first image based on the maximum brightness adjustment intensity parameter and the target brightness adjustment intensity, it is possible that the brightness adjustment is adjusted within a range of the maximum brightness adjustment intensity parameter determined based on the brightness statistical information, and thus different brightness regions in the image can obtain appropriate brightness enhancements, and the quality of the brightness adjusted image is improved.

FIG. 2 illustrates an example of a global brightness adjustment framework according to an embodiment of the present disclosure.

According to an embodiment, as shown in FIG. 2, the determining of the maximum brightness adjustment intensity parameter corresponding to the first image 210 according to the brightness statistical information, may include: performing histogram equalization 222 on the first image 210 to acquire a histogram equalized image 224 corresponding to the first image according to the brightness statistical information; determining the maximum brightness adjustment intensity parameter corresponding to the first image 210 based on the histogram equalized image 224. For example, a histogram equalization 222 may be obtained by first making a statistics for the distribution of the brightness values of the first image 210 and redistributing the brightness values with a uniform distribution, and then the histogram equalized image 224 is obtained based on the histogram equalization 222. As an example, the maximum brightness adjusted intensity parameter may be represented in a form of a maximum brightness residual map 240. The maximum brightness residual map 240 may indicate a maximum brightness residual between the brightness enhanced image that satisfies a desired visualization effect and the first image 210.

Due to limited manual image brightness adjustment, which may lead to insufficient brightness boost of the very dark image, in order to obtain a maximum brightness adjustment strength of the image, the histogram equalized image 224 may be obtained by redistributing the image pixel values based on the brightness statistical information of the first image 210, and the maximum brightness adjustment strength parameter may be determined based on the histogram equalization image 224, e.g., by using the histogram equalized image 224 as a prior information to guide the network to obtain the maximum brightness residual map 240 in a better visualize effect range. The reason for using the histogram equalized image 224 as the maximum brightness prior to obtain the maximum brightness residual map 240 is that the histogram equalization 222 extends the pixel values to the entire dynamic range for redistribution, and since the histogram equalization 222 stretches the pixel values over the entire range, it enhances the contrast of the image and increases the brightness of the dark regions, so that the histogram equalized image 224 has a higher brightness and a higher global contrast, which may help the network better handle overly dark and overly bright regions, but it is unnatural due to wrong colors and overly high brightness. Therefore, the present disclosure may use the histogram equalized image 224 after histogram equalization 222 as good brightness prior information to help the network estimate the maximum brightness residual map 240, and guide the image to obtain the greatest possible brightness under the guidance of this prior information, instead of directly using the histogram equalized image 224 to perform the brightness adjustment on the first image 210, thereby making it possible to both enhance the dark regions to be sufficiently bright and the bright regions not to be overexposed, while avoiding the unnatural problem in the histogram equalization image 224.

According to an embodiment, the determining of the maximum brightness adjustment intensity parameter corresponding to the first image 210 based on the histogram equalization image 224, may include: acquiring a brightness difference between the first image 210 and the histogram equalization image 224; determining the maximum brightness adjustment intensity parameter according to the brightness difference and image features of the first image. For example, as shown in FIG. 2, a brightness difference map 226 between the first image 210 and the histogram equalized image 224 may first be acquired; enhanced image features of the first image 230 are acquired based on the brightness difference map 226 and the image features of the first image 220; and the maximum brightness residual map 240 is predicted using an artificial intelligence network 235 based on the enhanced image features 230. For example, as shown in FIG. 2, the brightness difference map 226 may be obtained by subtracting the first image 210 and the histogram equalization image 224, and the enhanced image features 230 may be obtained by performing brightness embedding 228 on the brightness difference map 226 and concatenating the features 220 obtained by performing the brightness embedding 228 with the image features of the first image 220. The brightness difference map 226 between the histogram equalized image 224 and the input image 210 as a prior of the maximum brightness may guide the image brightness enhancement with the maximum brightness and better visualization.

As an example, the brightness embedding 228 may be performed on the brightness difference map 226 as shown in FIG. 3. First, the brightness difference map 226 may be smoothed by performing Gaussian filtering 310 to remove noise and details. Subsequently, average pooling 320 is used to obtain region features to avoid non-normal pixels misrepresenting image features. Next, convolution 330 is performed on the region features to obtain feature $F^a$ 332, and subsequently normalized region features 342 are obtained according to the following equations to transform the brightness difference map 226 to an image feature space.

$$F_i^{a'} = \sigma_b\left(\frac{F_i^a - \mu_a}{\sigma_a}\right) + \mu_b$$

$$\mu_a = \frac{1}{HW}\sum F_i^a$$

$$\sigma_a = \sqrt{\frac{1}{HW}\sum (F_i^a - \mu_a)^2}$$

wherein, $$F_i^a$$

is the ith regional feature, $$F_i^{a'}$$

is the ith normalized regional brightness feature, $\mu_b$ and $\sigma_b$ are a mean and variance of the image feature $F^b$ of the first image, respectively, $\mu_a$ and $\sigma_a$ are the mean and variance of $F^a$, respectively, H and W are a height and width of $F^a$, and the number of feature channels of $F^a$ is C.

Finally, the image features $F^b$ 228 and the normalized features $F_i^{a'}$ 342 of the brightness difference map 226 are combined as the enhanced image features 230.

In an embodiment, after performing Gaussian filtering 310 to smooth the difference map removing noise and details, resulting in a 4H*4W*1 brightness difference map, after applying Average Pooling 320 to obtain regional brightness priors, generating an H*W*1 brightness difference map, and last after performing convolution transforming 330 of the maximum difference map into the image feature space to obtain the H*W*C dimension of feature. As shown in FIG. 2, after the first image 210 is acquired, feature extraction may be performed on the first image 210 to obtain the image features of the first image 220, and then, based on the image features of the first image 220, the enhanced image features of the first image 230 are obtained using a maximum brightness guidance block 225 according to an embodiment of the present disclosure. After the enhanced image features of the first image 230 are obtained, the maximum brightness residual map 240 may be predicted using an artificial intelligence network 235 based on the enhanced image features 230. After the maximum brightness residual map 240 is obtained, the brightness adjustment may be performed on the first image 210 based on the maximum brightness residual map 240 and the target brightness adjustment intensity to obtain the enhanced images of the first image 250.

According to an embodiment, as shown in FIG. 2, the target brightness adjustment intensity α may be detected based on a control input of the user 245, e.g., as the user slides a slider bar for adjusting the brightness, the target brightness adjustment intensity α may be detected according to a parameter indicated by the slider bar. According to an embodiment, the performing of the global brightness adjustment on the first image 210 based on the maximum brightness residual map 240 and the target brightness adjustment intensity may include: performing a weighted fusion on the first image and the maximum brightness residual map based on the target brightness adjustment intensity to obtain an enhanced image of the first image 250. For example, the enhanced image of the first image 250 may be obtained according to the following equation.

$$\text{output} = \text{input} + \alpha \times \text{Residual}$$

Wherein, input is the first image 210, α is the target brightness adjustment intensity, Residual is the maximum brightness residual map 240, and output is the enhanced image of the first image 250.

In the global brightness adjustment process, only the maximum brightness residual map 240 may be needed in addition to the target brightness adjustment intensity, so the network for predicting the maximum brightness residual map may be run only once to obtain and store the maximum brightness residual map 240, and then the enhanced images 250 of various brightness levels may be obtained by adjusting the target brightness adjustment intensity, which allows the brightness adjustment process to run in real time.

The enhanced image of the first image 250 obtained after the global brightness adjustment may be output to the user, or the enhanced image of the first image 250 obtained after the global brightness adjustment may be used as the first image in the step S110 shown in FIG. 1, and may be further performed the brightness adjustment by continuing to perform the step S120 shown in FIG. 1 to obtain a better brightness adjustment effect.

The global brightness adjustment according to an embodiment of the present disclosure has been described above, and local brightness adjustment according to an embodiment of the present disclosure will be described below.

According to an embodiment of the present disclosure, the target brightness adjustment intensity may be the brightness adjustment intensity corresponding to the target local region in the first image 210, in this case, the above-described performing of the brightness adjustment on the first image 210 based on the target brightness adjustment intensity, may include: performing the brightness adjustment on the target local region based on the target brightness adjustment intensity; acquiring a correlation between the semantic features of respective semantic categories in the first image; performing the brightness adjustment on the other local regions of the first image except the target local region based on the correlation.

Since the adjusted target local region can easily become much brighter than the other regions after the brightness adjustment is performed on the target local region, the visual effect may be disharmonious if the other regions are not processed accordingly, especially the regions around the boundary. In order to eliminate such disharmony between the regions, according to an embodiment of the present disclosure, after the brightness adjustment is performed on the target local region of the first image, the correlation between semantic features of respective semantic categories in the first image may be obtained, and based on the correlation, the brightness adjustment may be performed on the other local regions of the first image except the target local region, so that after the brightness adjustment of the target local region, the disharmony between the target local brightness region and the other local regions may be reduced, thereby making the adjusted image more natural and improving the image quality.

According to an embodiment, the performing of the brightness adjustment on the target local region based on the target brightness adjustment intensity, may include: determining brightness distribution information of the target local region; performing the brightness adjustment on the target local region based on the brightness distribution information of the target local region and the target brightness adjustment intensity. Since the brightness adjustment is performed on the target local region based on the brightness distribution information of the target local region and the target brightness adjustment intensity, not only the brightness adjustment can be performed on the target local region, but also different pixels within the target local region can be enhanced to different degrees. The image quality may be improved by using local adjustment tools with adapted shapes for different semantic regions, e.g. using a gradient filter to adjust the darkness of the sky, while using an ellipse filter with an appropriate size to increase the brightness of the face. Therefore, according to an embodiment, different brightness enhancement coefficients may be applied to different semantic regions for brightness adjustment. For example, the brightness enhancement coefficients for respective semantic regions in the target local region may first be determined based on the brightness distribution information of the target local region and the target brightness adjustment intensity, and then the brightness adjustment may be performed on the target local region based on the brightness enhancement coefficients. The brightness distribution information of the target local region may contain brightness distribution features of the respective semantic regions in the target local region. In the present disclosure, this enhancement method is referred to as "semantic awareness feature enhancement".

As an example, a semantic map corresponding to the first image may be acquired, and the target brightness adjustment intensity for the respective semantic regions in the target local region may be determined based on the semantic map and the target brightness adjustment intensity, e.g., after the target brightness adjustment intensity input by a user is detected, a target brightness adjustment intensity map corresponding to the first image may be obtained based on the semantic map and the target brightness adjustment intensity, wherein the target brightness adjustment intensity map indicates the target brightness adjustment intensity for the respective semantic region in the target local region. As shown in FIG. 4, in the target brightness adjustment intensity map 410, the target brightness adjustment intensity for each of the different semantic regions contained in the target local region may be different. After the target brightness adjustment intensity map 410 is obtained, as shown in FIG. 4, the semantic awareness feature enhancement 420 may be performed based on the target brightness adjustment intensity map 410 and the image features of the first image 220 that contain brightness distribution information to obtain the enhanced image features 430. For example, the brightness enhancement coefficients for the respective semantic regions in the target local region may be determined based on the target brightness adjustment intensity map 410 and the image feature containing brightness distribution information 220, and the brightness adjustment may be performed based on the brightness enhancement coefficient for the respective semantic regions in the target local region. Such feature enhancement containing semantic information may realize appropriate enhancement for different semantic regions, so that the image may be displayed more clearly.

According to an embodiment, the adjusting of the brightness of the target local region based on the brightness enhancement coefficients may include: converting the brightness enhancement coefficient into a convolution kernel; performing mask convolution on image features containing the brightness distribution information utilizing the convolution kernel, to obtain the enhanced image features of the first image 430.

FIG. 5 is a schematic diagram illustrating semantic awareness enhancement 420 according to an embodiment of the present disclosure. As shown in FIG. 5, the brightness enhancement coefficients for the respective semantic regions in the target local region may be determined based on the image features containing brightness distribution information of the first image 220 and the target brightness adjustment intensity map 410, and such brightness enhancement coefficient may be referred to as "semantic significance local feature enhancement coefficient" in the present disclosure. As shown in FIG. 5, after the brightness enhancement coefficient is obtained, the brightness enhancement coefficient can be converted into a convolution kernel W by performing convolutional transformation 422 and reshaping 424 on the brightness enhancement coefficient. The h, w, k, and ch in FIG. 5 are the height and width of the feature, the size of the convolution kernel, and the number of channels, respectively. After the brightness enhancement coefficient is converted into a convolution kernel, the convolution kernel may be utilized to perform mask convolution 426 on the image features to obtain the enhanced image features of the first image. By performing the mask convolution 426, it is realized that only the features of the target local region in the first image are enhanced 430, and thus the brightness adjustment of the target local region is realized.

Figure 6:
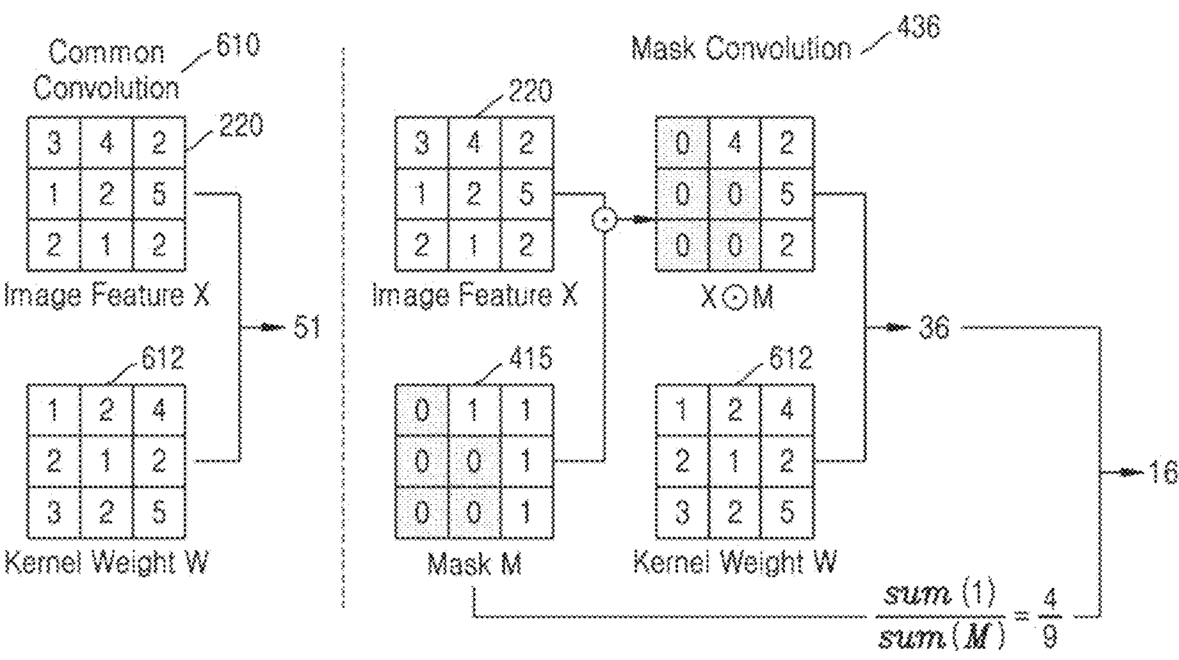
FIG. 6 is a schematic diagram illustrating performing mask convolution according to an embodiment of the present disclosure.

FIG. 6 is a schematic diagram illustrating performing mask convolution according to an embodiment of the present disclosure. As shown in FIG. 6, unlike common convolution 610 that utilizes the entire convolution kernel W 612 to perform the convolution on the image features 220, the mask convolution 426 utilizes the mask M 415 and the kernel weight (e.g. convolution kernel) W 612 to perform the convolution on only a portion of the image features, e.g., positions where the mask is 0 are not convolved. By the mask convolution 436, it can be realized that only the brightness enhancement coefficients of the respective semantic regions in the local region are utilized to perform the convolution on the corresponding semantic region, so as to acquire the enhanced image features of the first image 440 in which only the features of the target local region are enhanced, and thus to realize the brightness adjustment on the target local region only.

Figure 7:
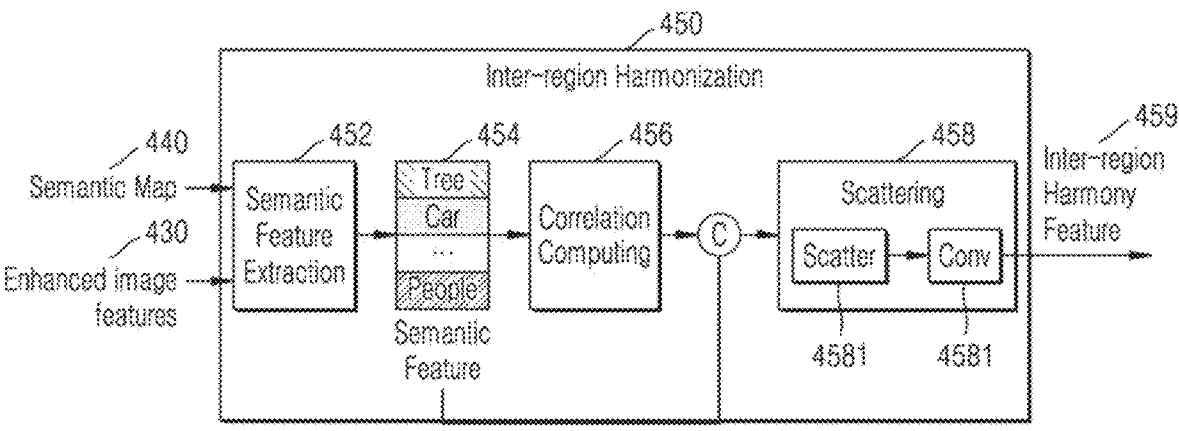
FIG. 7 is a schematic diagram illustrating inter-region harmonization according to an embodiment of the present disclosure.
Figure 8:
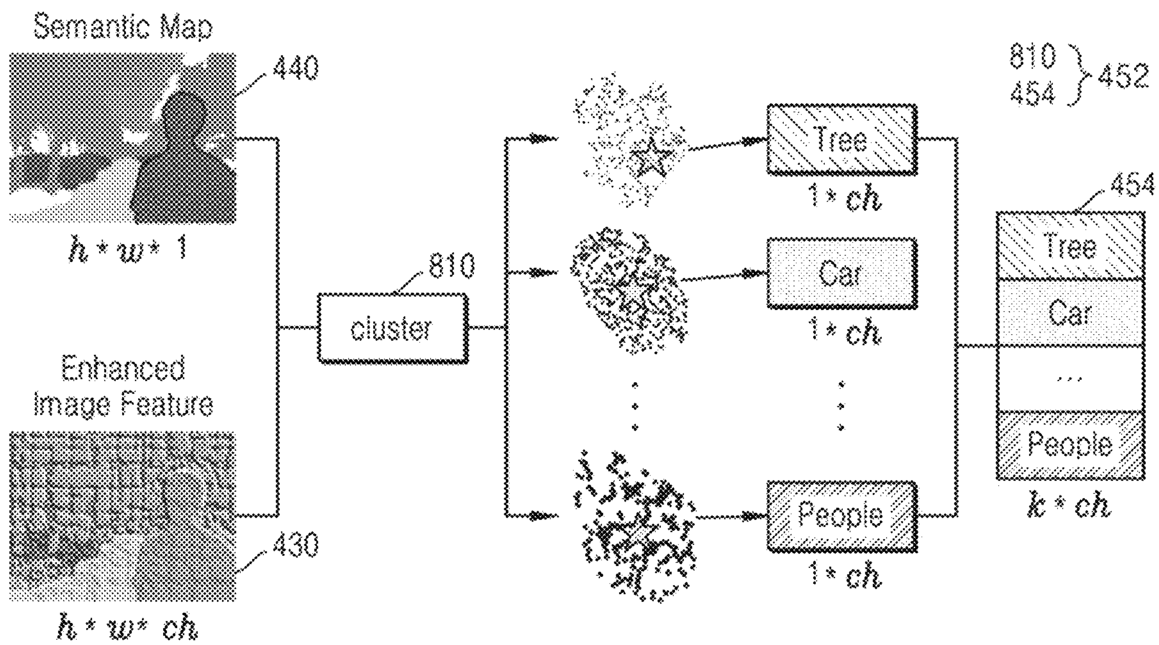
FIG. 8 is a schematic diagram illustrating extracting semantic features according to an embodiment of the present disclosure.

As described above, after the target local region is adjusted, the disharmony between the target local region and other regions may exist, and for this reason, as shown in FIG. 4, inter-region harmonization 450 may be performed to remove the disharmony between regions after performing semantic awareness enhancement 420. According to an embodiment, the correlation between semantic features of respective semantic categories in the first image may be acquired, and based on the correlation, the brightness adjustment may be performed on the other local regions of the first image except the target local region, so that the image after performing the brightness adjustment looks more harmonious. FIG. 7 is a schematic diagram illustrating inter-region harmonization 450 according to an embodiment of the present disclosure. As shown in FIG. 7, for example, after the enhanced image features of the first image 430 are acquired, the semantic features may be extracted 452 based on the semantic map 440 of the first image and the enhanced image features 430, and the correlation may be acquired based on the semantic features 454. As an example, as shown in FIG. 8, the semantic features may be extracted by clustering 810 the enhanced image features 430 using semantic labels in the semantic map 440. For example, semantic features 454 for the semantic labels Tree, Car, and People may be extracted, respectively. FIG. 8 illustrates an embodiment of semantic feature extraction 452.

After the semantic features are extracted, the correlation between the semantic features may be calculated, and based on the correlation, the brightness adjustment may be performed on the other local regions except the target local region to achieve inter-region harmony. According to an embodiment, the performing of the brightness adjustment on the other local regions of the first image except the target local region based on the correlation, may include: adjusting semantic features corresponding to the other local regions according to the correlation; performing the brightness adjustment on the other local regions according to the adjusted semantic features corresponding to the other local regions.

Figure 9:
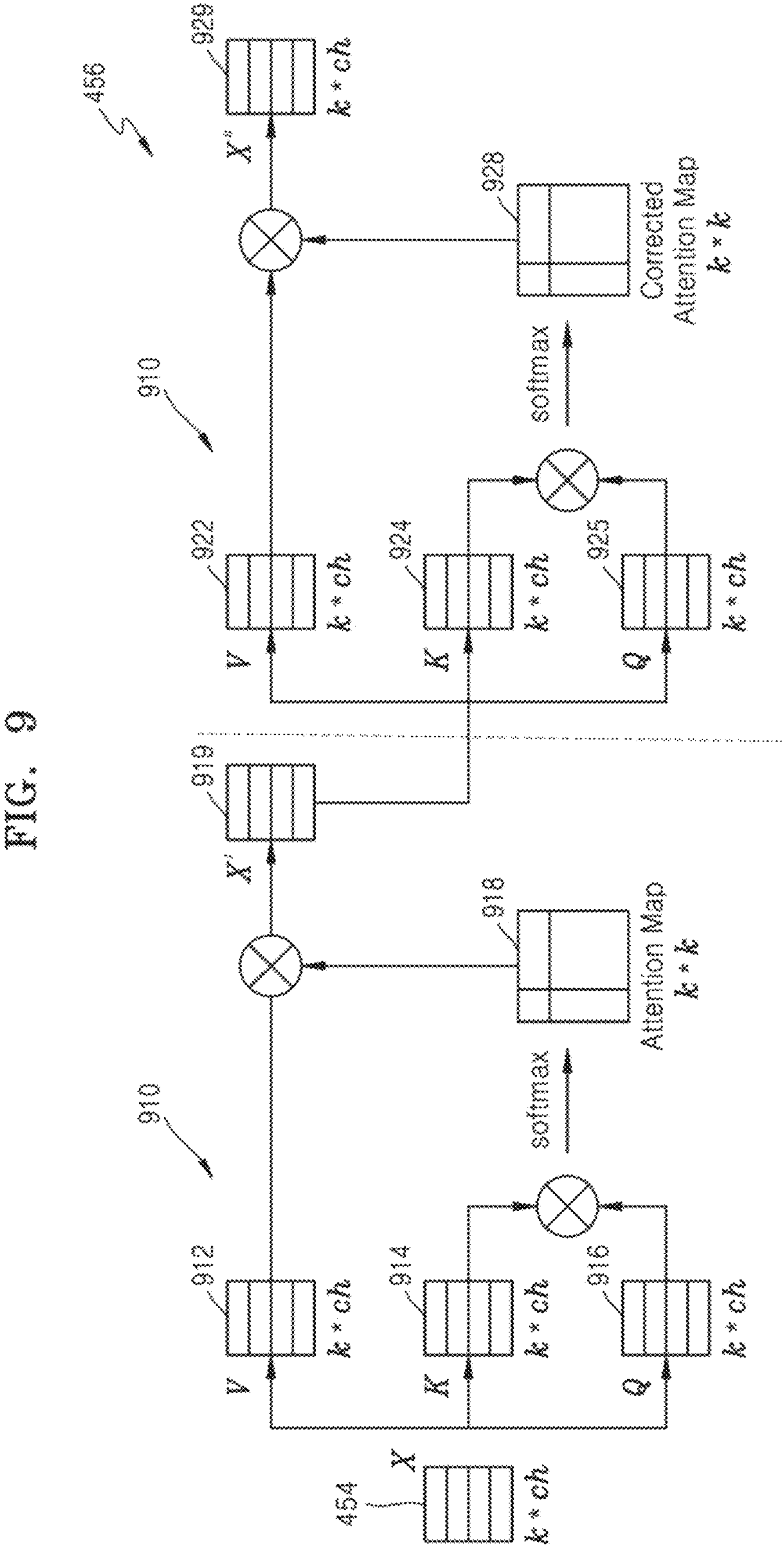
FIG. 9 is a schematic diagram illustrating inter-region harmonization based on semantic features according to an embodiment of the present disclosure.

For example, as shown in FIG. 9, at operation 1 910, mapping of the extracted semantic features X 787 in three ways of V, K, and Q may be performed, and the semantic features after the K mapping 914 and the Q mapping 916 may be performed multiplication operation and then go through a softmax function to obtain an attention map 918, which may also be referred to as a correlation map, which may indicate the correlation between the semantic features. Subsequently, by performing an operation on the semantic features after the V mapping 912 and the attention map 918, the correlation between the semantic features may be reflected into the semantic features X' 919, realizing the adjustment of the semantic features corresponding to the other local regions according to the correlation, and subsequently, by performing the brightness adjustment of the other local regions according to the adjusted semantic features corresponding to the other local regions, the inter-region harmonization between the target local region and the other local regions can be realized. Next, at operation 2 920, the semantic features X' 919 reflecting the above correlation may be further mapped in three ways of V, K, and Q, and a corrected attention map 928 may be obtained by performing multiplication operation on the semantic features after the K mapping 924 and the Q mapping 926 and then performing the operation of the softmax function, the corrected attention map 928 may reflect the correlation between semantic features after the semantic features corresponding to the other local regions have been adjusted. Subsequently, by performing the operation between the semantic features after the V mapping 922 and the corrected attention map 928, the correlation between the corrected semantic features can be reflected into the semantic features X' 919, thereby enabling recalibration of the semantic features corresponding to the other local regions, thereby making it possible that the inter-regional harmonization between the other local regions is further realized by operation 2 920 on the basis that the harmonization between the target local region with the other local regions is realized by operation 1 910. By operation 1 and operation 2 920, the overall harmonization of all semantic regions in the input image 929 may be achieved.

After the correlation is calculated and the semantic features corresponding to the other local regions are adjusted according to the correlation as shown in FIG. 9, the inter-region harmonization features 459 may be obtained by mapping harmonized semantic features in which the semantic features corresponding to the other local regions have been adjusted back to the image space according to the semantic map corresponding to the first image. For example, as shown in FIG. 7, the semantic features may first be scattered back into the image space 4581, and then the convolution 4582 may be performed to obtain the inter-region harmony features 459. The inter-region harmony features 459 are the features obtained after the enhanced image features have undergone the inter-region harmonization 450.

After the inter-region harmonization 450, one image may contain different individuals of the same semantic category, which may have different brightness and are required to have different brightness adjustment intensities, and in order to keep the different individuals of the same semantic category differentiated, as shown in FIG. 4, after inter-region harmonization 450 is performed, intra-region harmonization 460 may be performed, and intra-region harmonization can be also referred to as "intra-region differentiation". According to one or more embodiments, the performing of the brightness adjustment on the first image based on the target brightness adjustment intensity may include: for the local regions in the first image having the same semantic category, performing the brightness adjustment on corresponding local regions based on image features of the local regions. For the local regions in the first image having the same semantic category, the diversity of different individuals in the same semantic category may be realized by performing the brightness adjustment on the corresponding local regions based on the image features of the local regions. For example, the enhanced image features are fused with inter-region harmony features to realize the fusion of the original image features into the semantic features to increase the diversity of different individuals in the same semantic category.

Figure 10:
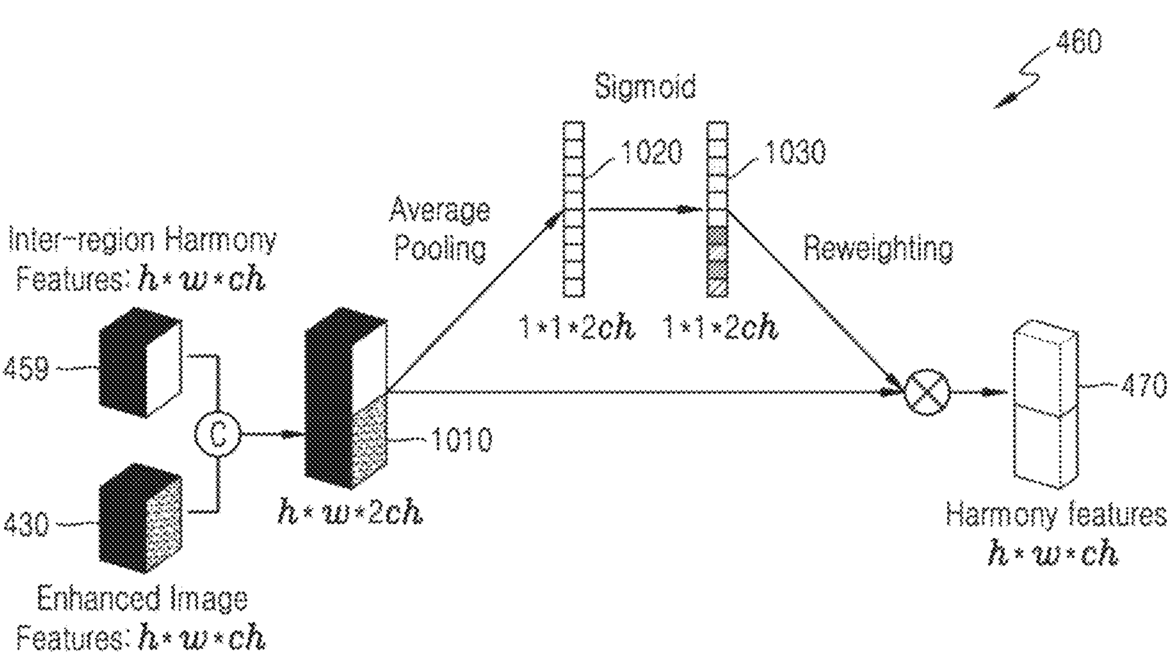
FIG. 10 is a schematic diagram illustrating intra-region differentiation according to an embodiment of the present disclosure.

FIG. 10 is a schematic diagram illustrating intra-region differentiation according to one or more embodiments of the present disclosure. As shown in FIG. 10, the enhanced image features 430 of the first image can be concatenated with the inter-region harmony features 459, and then average pooling can be performed on the concatenated features 1010 of the two channels, and the importance of the two kinds of features 1030 may be obtained by making the pooled features 1020 go through a Sigmoid function. Subsequently, the enhanced image features 430 and the inter-region harmony features 459 can be fused based on the importance thereof 1030 to obtain the fused features, i.e., the final harmony features 470 (i.e., the harmonized features in FIG. 4). The enhanced image features 430 can reflect the difference of different individuals of the same semantic category, while the inter-region harmonization features 459 may reflect the similarity of the individuals of the same semantic category, and the fusion between the enhanced image features 430 and the inter-region harmony features 459 can achieve a balance between the difference and the similarity. The importance of the enhanced image features and the inter-region harmony features 1030 may measure the importance of the image features and the semantic features. For example, channel attention may be used to adaptively learn the importance of different features, and important features are enhanced and unimportant features are weakened to balance the importance between the semantic features and the image features, so that the brightness diversity of different individuals in the same semantic category can be achieved.

Above, the local brightness adjustment according to one or more embodiments of the present disclosure has been described. The enhanced image obtained after the local brightness adjustment may be output to the user, or, the enhanced image obtained after the local brightness adjustment may be used as the first image in the step S110 shown in FIG. 1, and may continue to be performed a further brightness adjustment by performing the step S120 shown in FIG. 1, thereby obtaining a better brightness adjustment effect.

According to one or more embodiments, the first image may also be an image obtained by first performing the global brightness adjustment on the acquired image and then performing the local brightness adjustment on the globally adjusted image again. In an embodiment, the first image may be an image obtained by first performing the local brightness adjustment on the acquired image and then performing the global brightness adjustment on the locally adjusted image again.

Returning to refer to FIG. 1, after the image brightness information of the first image and the scene brightness information of the shooting scene corresponding to the first image are acquired at step S110, at step S120, the brightness adjustment may be performed on the first image based on the image brightness information and the scene brightness information. According to one or more embodiments, the image brightness information and the scene brightness information may be used as a prior information to guide the brightness adjustment of the first image.

It is to be noted that the method shown in FIG. 1 performed by the electronic device may be performed independently to perform automatic brightness adjustment directly on the first image, or it may be performed after the global brightness adjustment and/or the local brightness adjustment described above for further fine-tuning of the result of manual brightness adjustment, and the present disclosure is not limited thereto.

Manual adjustments may roughly adjust the brightness of an image in real time, but not all portions of the image are pleasant. The automatically adjusting of the brightness of an image may ignore the interaction with the user. In the related solutions, the user usually first makes a manual adjustment and then actively selects an automatic adjustment to fine-tune the image for a final satisfactory result, but this is not simple enough because the user cannot directly obtain a pleasant result in a single step. If the user manually adjusts the brightness to an appropriate level, and then the fine-tuning is performed automatically without being selected by the user, the user operation will be reduced and the user experience will be improved.

In response to this, according to one or more embodiments, step S120 may be performed in response to detecting that the performing of the brightness adjustment on the first image based on the target brightness adjustment intensity is finished, and thus, it may be possible to make the brightness adjustment more user-friendly by obtaining a higher quality enhanced image with fewer user operations.

Hereinafter, the operations involved in steps S110 and S120 are described in detail.

Figure 11:
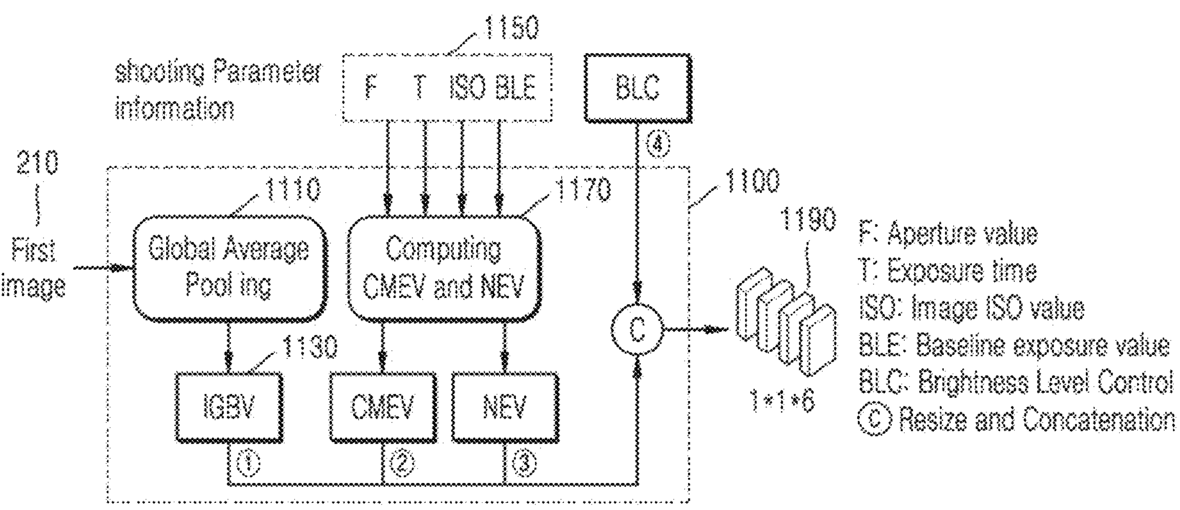
FIG. 11 is a schematic diagram illustrating operations of a prior computing block according to an embodiment of the present disclosure.

For convenience of description, in the present disclosure, the module for acquiring the image brightness information and the scene brightness information may be referred to as a "Priors Computing Block (PCB)", and its schematic diagram is shown in FIG. 11.

According to one or more embodiments, as shown in FIG. 11, the acquiring of the image brightness information of the first image and the scene brightness information of the shooting scene corresponding to the first image may include: performing global average pooling 1110 on the first image 210 to acquire the image brightness information 1130; acquiring the shooting parameter information 1150 of the first image 210, and acquiring the scene brightness information 1170 based on the shooting parameter information 1150.

For example, the image brightness information 1130 may include an Image Global Brightness Value (① IGBV in FIG. 11), but is not limited thereto. For example, the shooting parameter information 1150 may include at least one of the following: an aperture value (abbreviated as F in FIG. 11), an exposure time (abbreviated as T in FIG. 11), an International Standards Organization (abbreviated as ISO in FIG. 11, and ISO is a quantization of International Standards Organization, which is a measure of the light sensitivity of the film (photographic materials), and ISO can also be called light sensitivity), and baseline exposure (abbreviated as BLE in FIG. 11).

According to one or more embodiments, the acquiring of the scene brightness information 1170 based on the shooting parameter information 1150 may include: determining a camera metering exposure value based on the shooting parameter information; acquiring the scene brightness information based on the camera metering exposure value. For example, as shown in FIG. 11, a Camera Metering Exposure Value (② CMEV in FIG. 11) may be determined based on F, T, ISO, and BLE. The acquiring of the scene brightness information 1170 based on the shooting parameter information 1150 may include: determining a normalized exposure value based on the shooting parameter information 1150. In this case, the above acquiring of the scene brightness information 1170 based on the shooting parameter information 1150 may include: acquiring the scene brightness information based on the camera metering exposure value as well as the normalized exposure value. For example, as shown in FIG. 11, the Normalized Exposure Value (③ NEV in FIG. 11) may be determined based on F, T, ISO, and BLE.

For example, CMEV can be calculated by the following method:

1) Based on the following exposure formula, the metering exposure value $EV_{metering}$ can be calculated:

$$EV_{metering} = \log_2(F_m{}^2/T_m)$$

Wherein, $EV_{metering}=\log_2(F_m{}^2/T_m)$, $F_m$ is the F number of the camera aperture and $T_m$ is the exposure time. It should be noted that this formula is derived with ISO=100, and when photographing, the camera gives the suggested $EV_{metering}$ and the corresponding $F_m$, $T_m$. It can be seen that: (1) when the $EV_{metering}$ is fixed, and when we use a larger $T_m$, we should use a smaller aperture (larger $F_m$); (2) the brighter environment, the smaller suggested $T_m$, the larger $EV_{metering}$ should be; (3) when there is 2 times larger exposure time $2*T_m$, $EV_{metering}$ should be −1.

2) When photographing, although the measurement mode suggests the metering exposure value $EV_{metering}$, the user may still adjust the exposure by "minimizing/adding N apertures", called Exposure Compensation (EC), to obtain a desired exposure value $EV_{expected}=EV_{metering}-EC$.

3) When photographing, the desired exposure value and the corresponding aperture value $F_{real}$ and the exposure time $T_{real}$ are now obtained. However, due to the differences in image sensors, in order to obtain the desired $EV_{expected}$, we should consider a deviated baseline exposure value that varies with the ISO. $EV_{real}$ refers to a real exposure value.

$$EV_{expected} = EV_{metering} - EC = EV_{real} - BLE$$

$$EV_{real} = \log_2(F_{real}{}^2/T_{real})$$

Wherein, $F_{real}$ and $T_{real}$ can be read from the image's metadata.

4) The CMEV is calculated according to the following equation:

$$CMEV = EV_{metering} = EV_{real} - BLE + EC$$

For example, NEV can be calculated in the following way:

$$NEV = EV_{real} - BLC + \log_2(ISO/100)$$

As one or more examples, the brightness adjustment may be performed on the first image based on the CMEV, NEV, and IGBV. The CMEV, NEV, and IGBV of such information may be used as prior information to guide the brightness adjustment of the first image. If the first image is an image obtained by performing manual global brightness adjustment and/or local brightness adjustment, the target brightness adjustment intensity detected by the user during the global brightness adjustment and/or the local brightness adjustment, e.g., the Brightness Level Control (BLC) information, may also be obtained herein, the CMEV, NEV, IGBV, and BLC is took as the prior information to guide the brightness adjustment of the first image. For example, as shown in FIG. 11, resizing and concatenation can be performed on the CMEV, NEV, IGBV, and BLC to obtain a feature of size 1*1*6 1190, wherein 1 is the width and height and 6 is the number of channels.

After the image brightness information and the scene brightness information of the first image are acquired, the brightness adjustment may be performed on the first image based on the image brightness information and the scene brightness information. Since the brightness adjustment is performed on the first image based on the image brightness information and the scene brightness information, the brightness adjusted image may be made more suitable for the corresponding scene, and the image quality may be improved. For example, an artificial intelligence network may be utilized to perform the brightness adjustment on the first image based on the image brightness information and the scene brightness information. Since the images correspond to different suitable brightness in scenes with different ambient light, introducing the scene brightness information and the image brightness information as prior information can guide the network to predict the brightness that is more suitable for the corresponding scene. For example, the brightness of an image captured in a well-lit situation in a dark region should be improved much higher than a well-lit region, while for an image captured in a dark-light shooting environment, the brightness of the entire image should be increased to a greater extent.

As one or more examples, the performing of the brightness adjustment on the first image based on the image brightness information and the scene brightness information may include: determining the range of the adjustment intensity parameter corresponding to the first image based on the image brightness information and the scene brightness information; performing brightness adjustment on the first image according to the range of the adjustment intensity parameter.

According to one or more embodiments, the determining of the range of the adjustment intensity parameter corresponding to the first image based on the image brightness information and the scene brightness information may include: determining a brightness range of the first image based on image features of the first image; determining the range of the adjustment intensity parameter based on the brightness range, the image brightness information and the scene brightness information. For example, the determining of the brightness range of the first image based on the image features of the first image includes: determining a maximum brightness feature and a minimum brightness feature of the first image using maximum pooling and minimum pooling, respectively, based on the image features of the first image. In this case, the determining of the range of the adjustment intensity parameter based on the brightness range, the image brightness information and the scene brightness information includes: determining a maximum brightness adjustment intensity parameter corresponding to the first image based on the maximum brightness feature, the image brightness information, and the scene brightness information; determining a minimum brightness adjustment intensity parameter corresponding to the first image based on the minimum brightness feature, the image brightness information and the scene brightness information. According to one or more embodiments, the range of the adjustment intensity parameters may include: the maximum brightness adjustment intensity parameter and the minimum brightness adjustment intensity parameter. In this case, the performing of the brightness adjustment on the first image according to the range of adjustment intensity parameter may include: for each local region of the first image, fusing the maximum brightness adjustment intensity parameter and the minimum brightness adjustment intensity parameter corresponding to the local region based on a brightness value of the local region, and adjusting the brightness of the local region based on the fused adjustment intensity parameter. For example, the process may include: determining the local brightness adjustment intensity parameter corresponding to the local region based on image features of the local region; determining, based on the brightness value of the local region, a first weight of the maximum brightness adjustment intensity parameter, a second weight of the minimum brightness adjustment intensity parameter, and a third weight of the local brightness adjustment intensity parameter corresponding to the local region; performing weighted fusion on the maximum brightness adjustment intensity parameter, the minimum brightness adjustment intensity parameter and the local brightness adjustment intensity parameter using the first weight, the second weight and the third weight to acquire a fused local brightness adjustment intensity parameter corresponding to the local region; adjusting the brightness of the local region based on the fused local brightness adjustment intensity parameter corresponding to the local region.

As one or more examples, the maximum brightness adjustment intensity parameter may be a maximum adjustment curve for image brightness adjustment, wherein the maximum adjustment curve indicates the maximum brightness adjustment intensity for each pixel value in the first image. As one or more examples, the minimum brightness adjustment intensity parameter may be a minimum adjustment curve for image brightness adjustment, wherein the minimum adjustment curve indicates the minimum brightness adjustment intensity for each pixel value in the first image. As one or more examples, the local brightness adjustment intensity parameter may be a local adjustment curve for brightness adjustment of the local region in the image, wherein the local adjustment curve indicates the brightness adjustment intensity of the respective pixel value in the local region. As one or more examples, the fused local brightness adjustment intensity parameter corresponding to the local region may be an adjustment curve for the brightness adjustment of the local region obtained by fusing the maximum adjustment curve, the minimum adjustment curve, and the local adjustment curve, wherein the adjustment curve indicates a final brightness adjustment intensity of the respective pixel in the local region.

Figure 12:
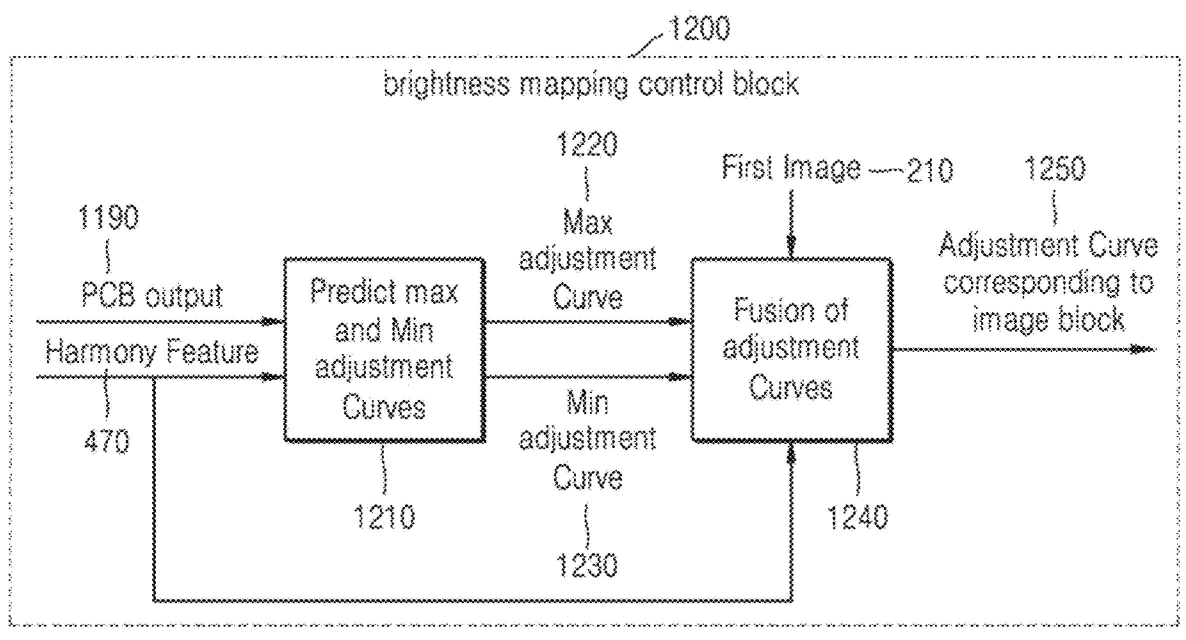
FIG. 12 is a schematic diagram illustrating operations of a brightness mapping control block according to an embodiment of the present disclosure.

In the present disclosure, for convenience of description, the module for determining the range of adjustment intensity parameter corresponding to the first image based on the image brightness information and the scene brightness information may be referred to as a brightness control mapping block 1200, and a schematic diagram of the operation thereof may be shown, for example, in FIG. 12.

Figure 13:
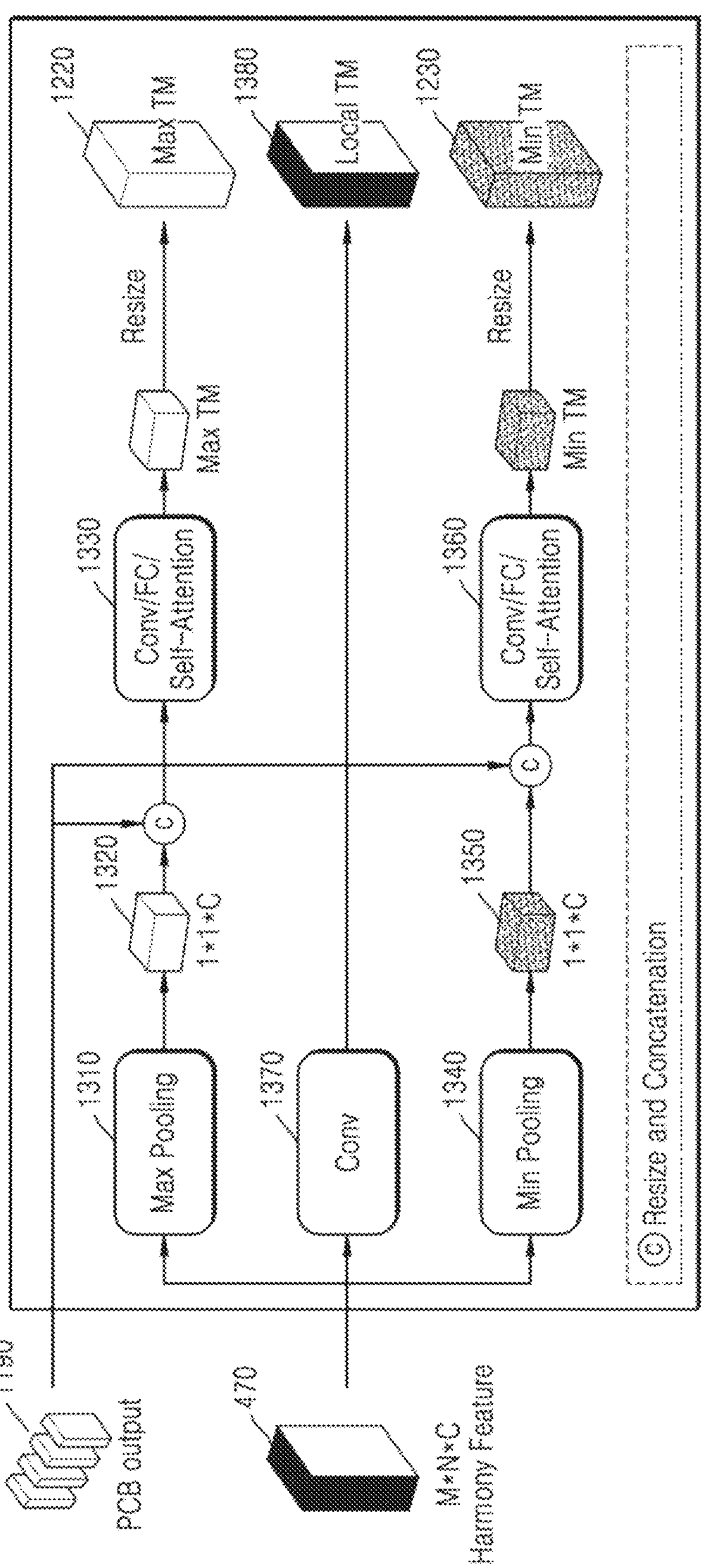
FIG. 13 is a schematic diagram of predicting an adjustment curve according to an embodiment of the present disclosure.

For example, as shown in FIG. 12, the maximum adjustment curve 1220 and the minimum adjustment curve 1230 may be predicted based on the output of the PCB 1190 (including the image brightness information and the scene brightness information) and the harmony features 470, and furthermore, the local adjustment curve corresponding to each local region may be obtained based on the image features of each local region of the first image. FIG. 13 illustrates a schematic diagram of predicting an adjustment curve according to one or more embodiments of the present disclosure. As shown in FIG. 13, based on the image brightness information, the scene brightness information, and the image features of the first image, the maximum adjustment curve 1220 and the minimum adjustment curve 1230 can be predicted using different prediction networks, respectively. In an embodiment, based on the output of the PCB 1190 and the image features 470, the maximum adjustment curve 1220 and the minimum adjustment curve 1230 can be predicted using different prediction networks, respectively. Since the maximum adjustment curve 1220 and the minimum adjustment curve 1230 are predicted using different prediction networks, the prediction results can be made to be less affected by the average attributes of the image, and the problem of insufficient brightness in extremely dark regions due to that the small pixel values to be swamped during the prediction process can be avoided.

As shown in FIG. 13, for example, the maximum pooling 1310 can be performed on the harmony features of M*N*C 470 to obtain the maximum brightness feature 1*1*C 1320, which is resized and concatenated with the output of the PCB, and then after convolution/full-connection/self-attention operation 1330, the maximum adjustment curve 1220 is predicted, and the maximum adjustment curve is referred to as the "Max TM" in FIG. 13. For example, the minimum pooling 1340 can be performed on the image features of M*N*C 220 to obtain the minimum brightness feature 1*1*C 1350, which is resized and concatenated with the output of the PCB 1190, and then after convolution/full connection/self-attention operation 1360, the minimum adjustment curve 1230 is predicted, and the minimum adjustment curve is referred to as the "Min TM" in FIG. 13. In addition, the convolution operation 1370 can be performed on image features of M*N*C 470 to obtain the local adjustment curve 1380, which is abbreviated as "local TM" in FIG. 13. Subsequently, as shown in FIG. 12, the maximum adjustment curve 1220, the minimum adjustment curve 1230, and the local adjustment curve 1380 are fused 1240 to determine the adjustment curve corresponding to the respective local region, i.e., the adjustment curve corresponding to the image block 1250. In the fusion, for the extremely dark region, the maximum adjustment curve should be given a greater weight, while for the overexposed region, the minimum adjustment curve should be given a greater weight, so as to avoid underexposure of the dark region and overexposure of the bright region in the brightness adjustment process. And for the better-lighted (e.g. well-lit) region, the local adjustment curve may be given a greater weight.

Figure 14:
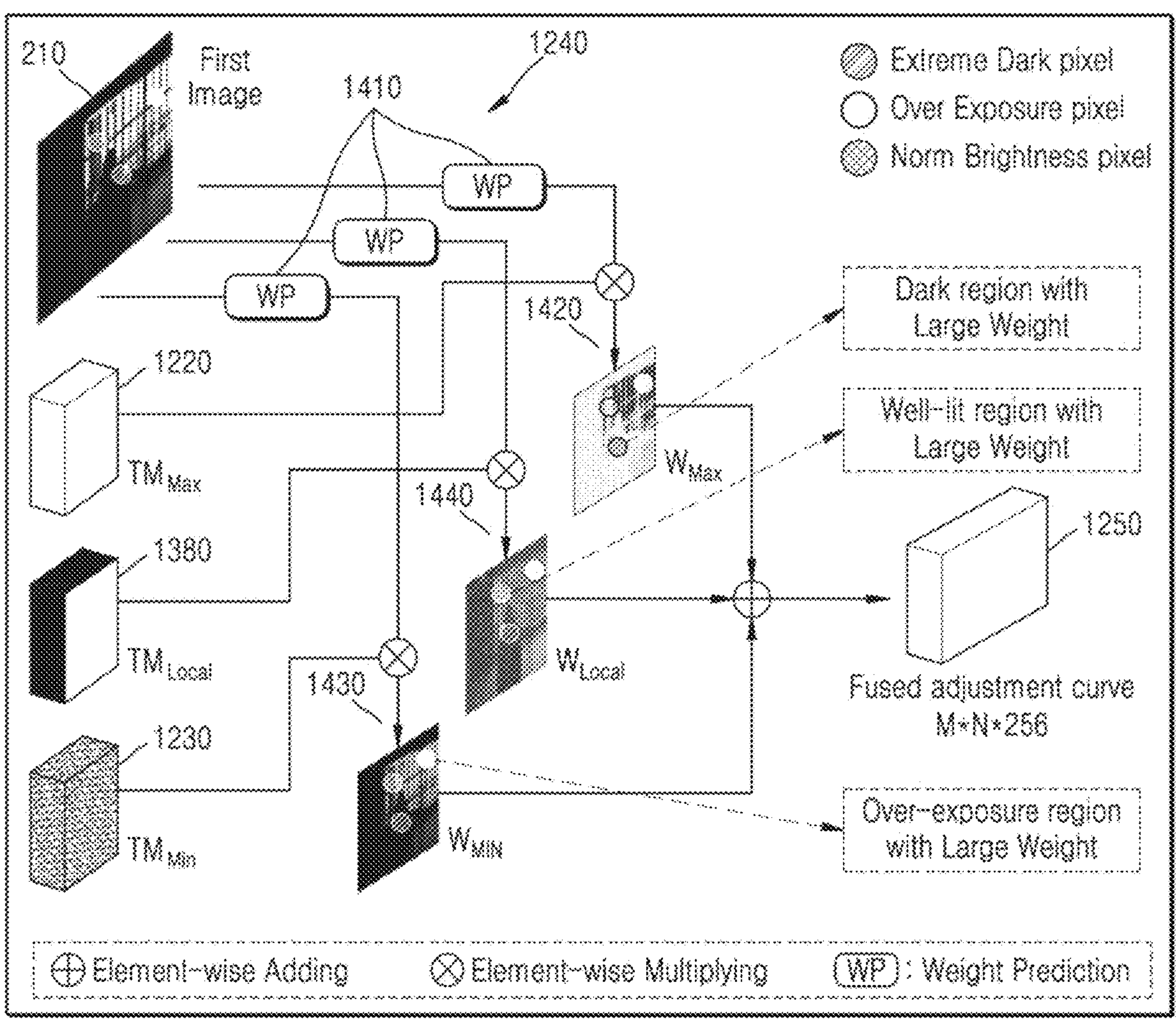
FIG. 14 is a schematic diagram of fusing adjustment curves according to an embodiment of the present disclosure.

FIG. 14 is a schematic diagram of fusing adjustment curves 1240 according to one or more embodiments of the present disclosure. As shown in FIG. 14, the fusing of the maximum adjustment curve 1220, the minimum adjustment curve 1230, and the local adjustment curve 1380 to determine the adjustment curves corresponding to the respective local regions 1250 may include: based on the brightness value of the local region in the first image 210, predicting the respective weights of the maximum adjustment curve 1420, the minimum adjustment curve 1430, and the local adjustment curve 1440 when performing the fusion; performing the weighted fusion 1410 on the maximum adjustment curve, the minimum adjustment curve, and the local adjustment curve according to the predicted weights, to determine the adjustment curves corresponding to the respective local regions. For example, a weight prediction network 1410 may be used to predict the weight $W_{Max}$ 1420 of the maximum adjustment curve 1220, the weight $W_{MIN}$ 1430 of the minimum adjustment curve 1230, and the weight $W_{Local}$ 1440 of the local adjustment curve 1380, respectively, based on the brightness values of the local region in the first image. Subsequently, the maximum adjustment curve $TM_{Max}$ 1220 is multiplied element-by-element with the weight $W_{Max}$ 1420, the minimum adjustment curve $TM_{Min}$ 1230 is multiplied element-by-element with the weight $W_{MIN}$ 1430, and the local adjustment curve $TM_{Local}$ 1380 is multiplied element-by-element with the weight $W_{Local}$ 1440 according to the following equation, and the result of the multiplication is summed up (element-wise added) to get the adjustment curve corresponding to the image block 1250, i.e., the fused adjustment curve TM:

$$TM = W_{Max} * TM_{Max} + W_{Min} * TM_{Min} + W_{Local} * TM_{Local}$$

After the adjustment curves corresponding to the respective local regions in the first image are determined, the brightness of the respective local regions may be adjusted based on the adjustment curve corresponding to each local region.

It has been found that the adjustment curve corresponding to each local region is the most applicable to the center pixel of the local region, and the pixels at other positions in the local region may be affected by the adjustment curves corresponding to adjacent local regions. Therefore, in order to obtain a better brightness adjustment result, according to one or more embodiments of the disclosure, the adjusting of the brightness of the local region based on the fused local brightness adjustment intensity parameter corresponding to the local region, include: for a center pixel in the local region, adjusting the brightness of the center pixel using a center brightness adjustment intensity parameter corresponding to the center pixel among the fused local brightness adjustment intensity parameter corresponding to the local region; for a non-center pixel in the local region, adjusting the brightness of the non-center pixel based on the fused local brightness adjustment intensity parameter corresponding to the local region and an adjacent brightness adjustment intensity parameter corresponding to an adjacent local region adjacent to the local region. For example, for the center pixel in the local region, the brightness of the center pixel is adjusted using the brightness adjustment intensity of the center pixel indicated in the adjustment curve corresponding to the local region, and for the non-center pixel in the local region, the brightness of the non-center pixel is adjusted based on the adjustment curve corresponding to the local region and the adjustment curves corresponding to the adjacent local regions of the local region.

According to one or more embodiments, the adjusting of the brightness of the non-center pixel based on the fused local brightness adjustment intensity parameter corresponding to the local region and the adjacent brightness adjustment intensity parameter corresponding to the adjacent local region adjacent to the local region, includes: mapping the fused local brightness adjustment intensity parameter corresponding to the local region and the adjacent brightness adjustment intensity parameter corresponding to the adjacent local region to be at a same spatial location; applying the fused local brightness adjustment intensity parameter corresponding to the local region and the adjacent brightness adjustment intensity parameter corresponding to the adjacent local region, respectively, to acquire brightness values of the non-center pixel adjusted using different brightness adjustment intensity parameters; performing bilinear interpolation on the brightness values adjusted using the different brightness adjustment intensity parameters to acquire a final brightness value of the non-center pixel. For example, mapping the adjustment curve corresponding to the local region and the adjustment curve corresponding to the adjacent local region to the same spatial position, applying the adjustment curve corresponding to the local region and the adjustment curve corresponding to the adjacent local region respectively in parallel to obtain the brightness values of the non-central pixel adjusted using the different adjustment curves, and then subsequently performing a bilinear interpolation on the brightness values adjusted using the different adjustment curves to obtain the final brightness values of the non-center pixel. By the above operation, the speed of the brightness adjustment can be increased, which is favorable for generating an enhanced image of the first image by performing the brightness adjustment on the image processing unit (GPU) or the neural network processing unit (NPU) in an end-to-end manner.

In one or more embodiments of the present disclosure, for convenience of description, the module for adjusting the brightness of the respective local regions according to the fused local brightness adjustment intensity parameter corresponding to each local region may be referred to as the brightness mapping and curve interpolation block 1500, the operation schematic diagram of which is shown in FIG. 15. For example, as shown in FIG. 15, an alignment position operation (① in FIG. 15) may first be performed to spatially shift the adjustment curves of adjacent local regions (also referred to as adjacent blocks) associated with a pixel in the local region (also referred to as "image block"), for example, assuming that the pixel is affected by the adjustment curves of three adjacent blocks, a left-shift convolution can be performed on the first adjacent block 1510, an up-shift convolution can be performed on the second adjacent block 1512, and a left-up-shift convolution can be performed on the third adjacent block 1514 according to the positions of the three adjacent blocks relative to the pixel, such that the adjustment curves corresponding to the image block in which the pixel is located and the adjustment curves corresponding to the adjacent blocks are mapped to be at the same spatial position. In addition, the first image 210 may be converted from a spatial dimension to a depth dimension so that the spatial dimension is reduced and the channel dimension is increased, e.g., the size of the first image, after converting it from the spatial dimension to a channel dimension, may be M*N*T 1516. Subsequently, adjusting curves corresponding to the image block and adjusting curves corresponding to the adjacent blocks are applied, respectively in parallel to obtain the brightness values of the non-central pixel adjusted using the different adjustment curves. For example, a dictionary mapping operation (② in FIG. 15) may be performed first, which is used to search in parallel for the adjustment intensity of the pixel on the different adjustment curves. Next, a multiple ratio operation (③ in FIG. 15) may be performed, which is used to apply the adjustment intensity of the pixel on the different adjustment curves in parallel to adjust the brightness of the pixel so as to obtain the brightness enhancement results of the pixel under the different curves. Subsequently, the brightness enhancement results adjusted using different curves are converted from the depth dimension back to the spatial dimension (e.g. alignment), i.e., the brightness enhanced pixels are mapped back into the original image space along the channel dimension (④ in FIG. 15). Finally, the bilinear interpolation is performed on the brightness values adjusted using different adjustment curves (⑤ in FIG. 15). For example, the bilinear interpolation may be performed on the brightness values enhanced using different adjustment curves (e.g. weight map 1520), according to the distances from the pixel to adjacent blocks, so as to obtain the brightness values enhanced by fusing different adjustment curves.

Figure 16:
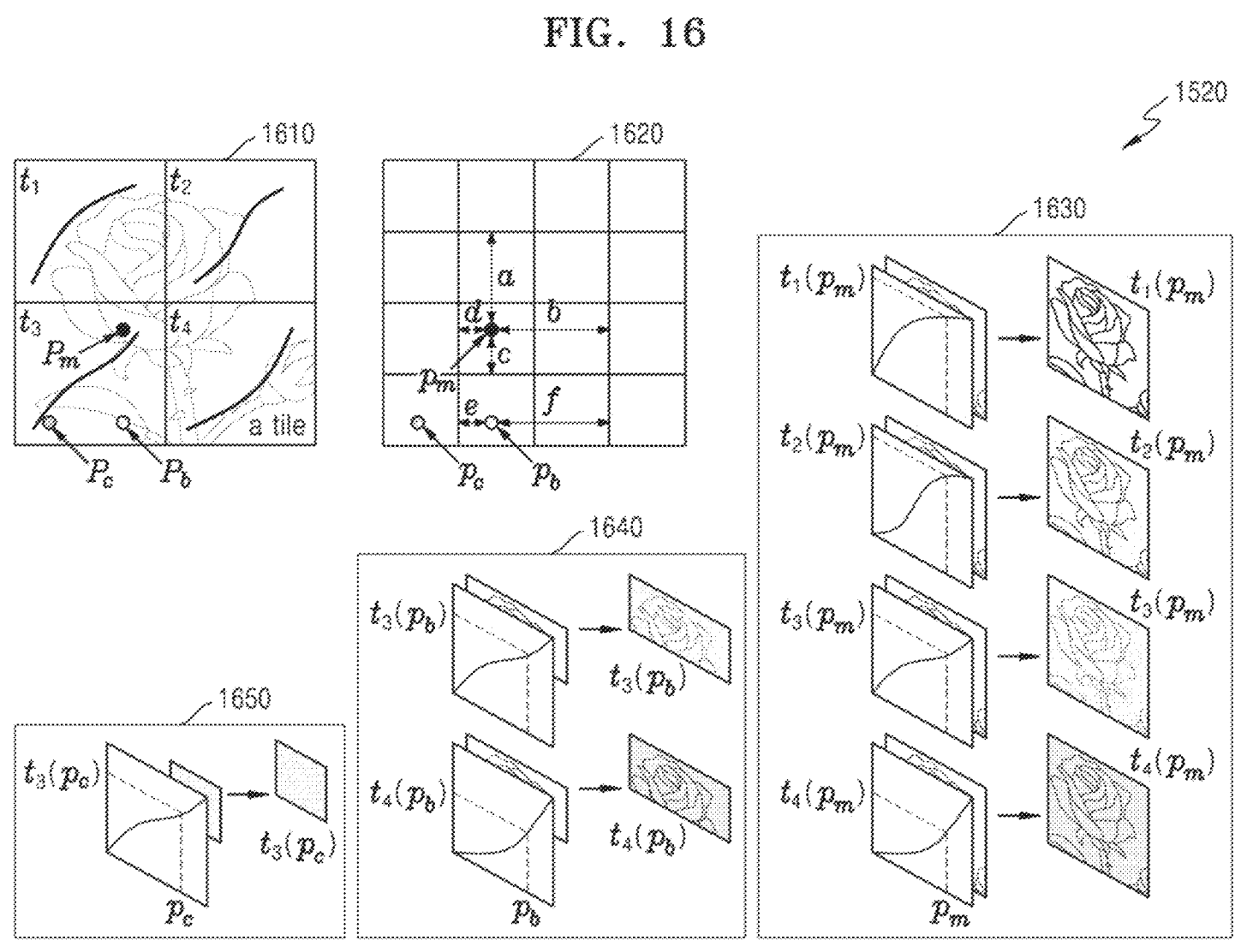

For example, as shown in FIG. 16, in 1610, for the pixel $p_b$ in the lower left image block, the adjustment curve of the image block in which it is located is $t_3$, and in addition, the pixel $p_b$ is affected by the adjustment curve $t_4$ corresponding to the surrounding adjacent block, in this case, the adjusted brightness value of pixel $p_b$ can be obtained based on the adjustment curves $t_3$ and $t_4$. For example, weights may be determined based on the distances e and f from $p_b$ to the adjacent blocks 1620, and the final brightness value $\hat{p}_b$ of the pixel $p_b$ may be obtained by performing a bilinear interpolation on the adjusted brightness values $t_3(p_b)$ and $t_4(p_b)$ using the adjustment curves $t_3$ and $t_4$ 1640, respectively, according to the determined weight pairs by the following equation.

$$\hat{p}_b = \frac{ft_3(p_b) + et_4(p_b)}{e + f}$$

As an example 1630, for the pixel $p_m$ in the lower left image block, the adjustment curve of the image block in which it is located is $t_3$, and in addition, the pixel $p_m$ is affected by the adjustment curves $t_1$, $t_2$ and $t_4$ corresponding to the surrounding adjacent blocks, in this case, the adjusted brightness value of the pixel $p_m$ may be obtained based on the adjustment curves $t_1$, $t_2$, $t_3$ and $t_4$. For example, the final brightness value $\hat{p}_m$ of the pixel $p_m$ may be obtained by performing the bilinear interpolation on the brightness values $t_1(p_m)$, $t_2(p_m)$, $t_3(p_m)$, and $t_4(p_m)$ adjusted respectively utilizing the adjustment curves $t_1$, $t_2$, $t_3$, and $t_4$, based on the weight pairs determined according to the distances a, b, c, and d of the $p_m$ to the adjacent blocks 1620, by the following equation.

$$\hat{p}_m = \frac{bct_1(p_m) + dct_2(p_m) + abt_3(p_m) + adt_4(p_m)}{(a + c)(b + d)}$$

As an example, as is illustrated in 1650, for pixel $p_c$, since it is located at a corner region of the entire image and is far away from the adjacent block, the weight of the adjustment curve corresponding to the adjacent block is 0, and the brightness adjustment may be performed on pixel $p_c$ to obtain the adjusted brightness value $\hat{p}_c = t_3(p_c)$ of the pixel based only on the adjustment curve $t_3$ corresponding to the image block in which pixel $p_c$ is located.

Figure 17:
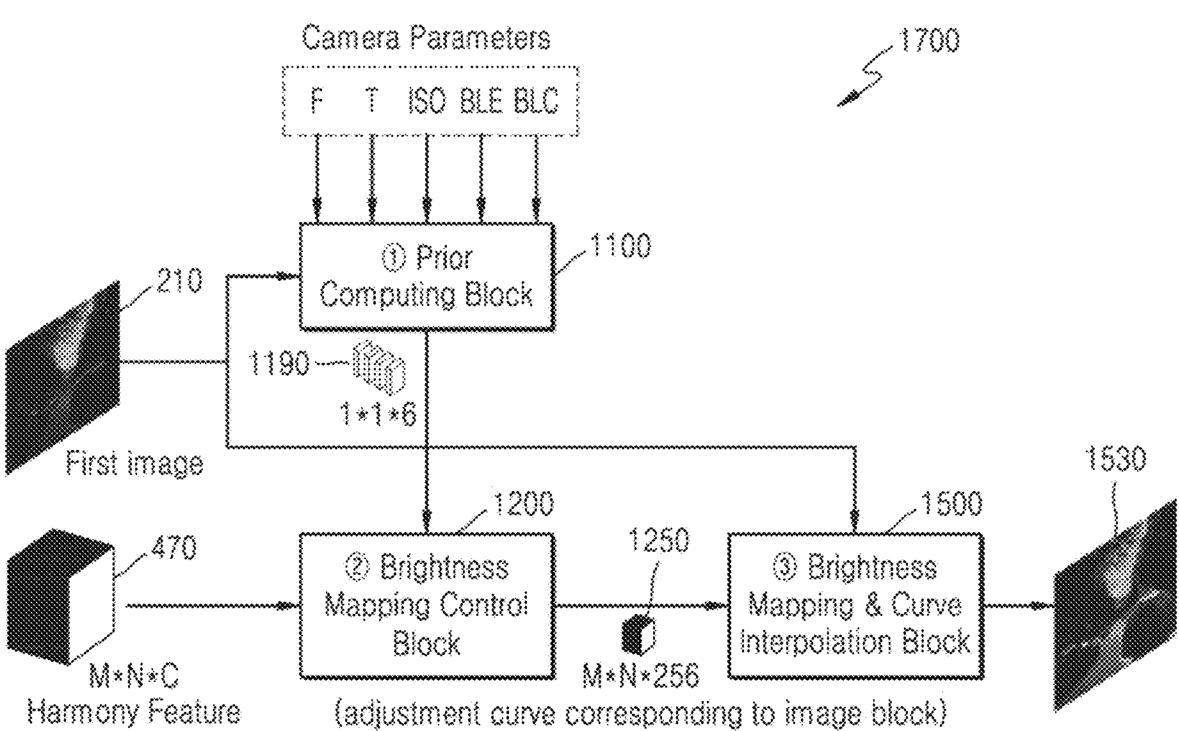
FIG. 17 is a schematic diagram illustrating an example of the method performed by the electronic device shown in FIG. 1.

FIG. 17 is a schematic diagram illustrating one or more examples of the method performed by the electronic device shown in FIG. 1. As shown in FIG. 17, after the first image is acquired, first, using the prior computing block 1100, the image brightness information 1130 is acquired based on the first image 210 and the scene brightness information 1170 is obtained based on shooting parameter information 1150, and then the adjustment curve corresponding to the image block is obtained by the brightness mapping control block 120 based on the harmony features of the first image 470 and the output of the prior computing block 1190. Then, the brightness of the respective image block is adjusted by the brightness mapping and curve interpolation block 1500 using the adjustment curve corresponding to each image block to obtain an enhanced image of the first image 1530.

The method shown in FIG. 1 has been described above in conjunction with the accompanying drawings, and the global brightness adjustment and the local brightness adjustment according to one or more embodiments of the present disclosure have been described above. The global brightness adjustment and the local brightness adjustment according to one or more embodiments of the present disclosure are not limited to being used only in the method shown in FIG. 1, but may be applied independently to perform the brightness adjustment on the first image to obtain the enhanced image of the first image, and thus the present disclosure also provides methods performed by the electronic device as described below.

Figure 18:
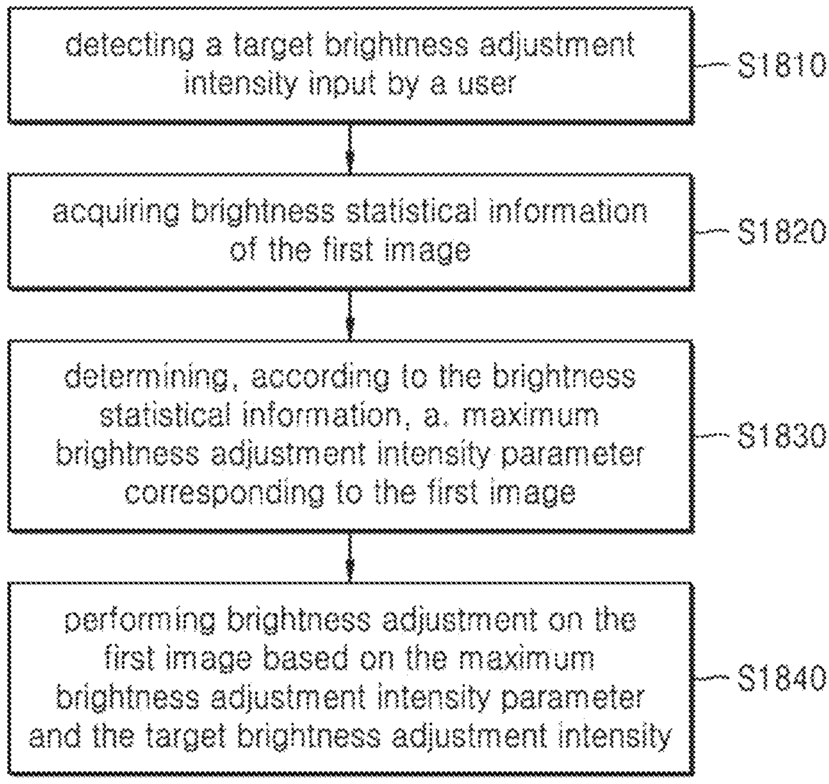
FIG. 18 is a flowchart illustrating a method performed by an electronic device according to another exemplary embodiment of the present disclosure.

FIG. 18 is a flowchart of a method performed by an electronic device according to an embodiment of the present disclosure. The method of FIG. 18 corresponds to the global brightness adjustment mentioned above. Referring to FIG. 18, at step S1810, a target brightness adjustment intensity input by the user is detected, wherein the target brightness adjustment intensity is the brightness adjustment intensity corresponding to a global region of the first image. At step S1820, brightness statistical information of the first image is acquired. At step S1830, according to the brightness statistical information, a maximum brightness adjustment intensity parameter corresponding to the first image is determined. At step S1840, brightness adjustment is performed on the first image, based on the maximum brightness adjustment intensity parameter and the target brightness adjustment intensity. The relevant details involved in the above operation have been described above and will not be repeated here. According to the method shown in FIG. 18, since the maximum brightness adjustment intensity parameter corresponding to the first image is determined according to the brightness statistical information of the first image, and the brightness adjustment is performed on the first image based on the maximum brightness adjustment intensity parameter and the target brightness adjustment intensity, it may be possible to cause the brightness adjustment to be adjusted within the range of the maximum brightness adjustment intensity parameter determined according to the brightness statistical information, and thus enabling the different brightness regions in the image to obtain a suitable brightness enhancement, thereby improving the quality of the brightness adjusted image.

Figure 19:
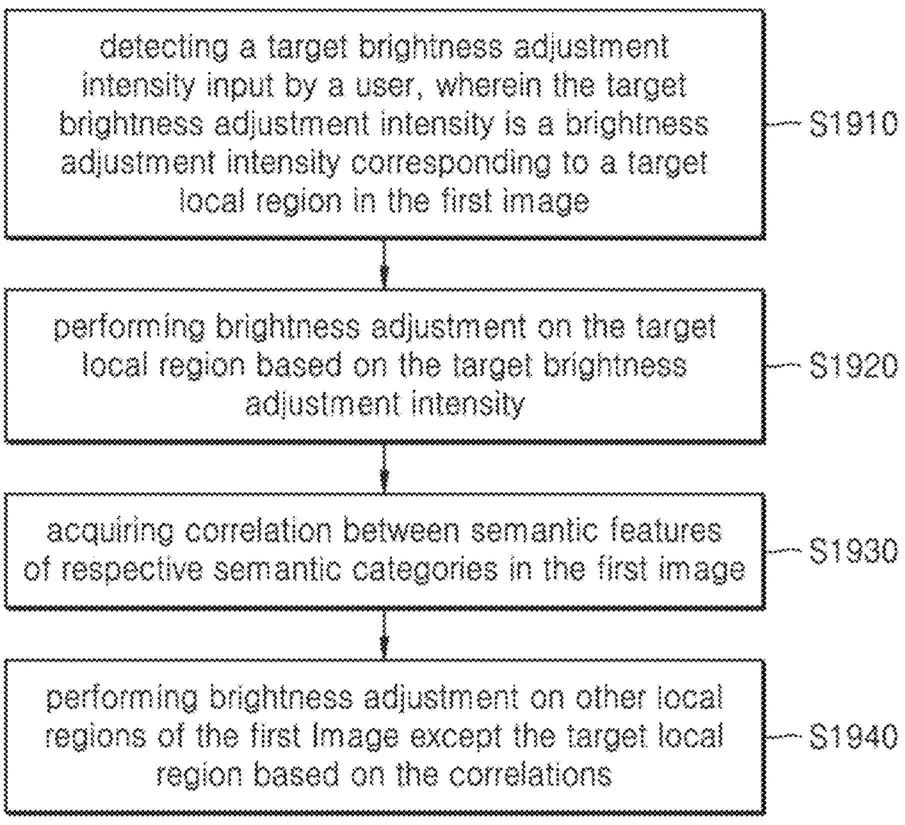
FIG. 19 is a flowchart of a method performed by an electronic device according to yet another exemplary embodiment of the present disclosure.

FIG. 19 is a flowchart of a method performed by an electronic device according to an embodiment of the present disclosure. The method of FIG. 19 corresponds to the local brightness adjustment mentioned above. Referring to FIG. 19, at step S1910, a target brightness adjustment intensity input by the user is detected, wherein the target brightness adjustment intensity is a brightness adjustment intensity corresponding to a target local region in the first image. At step S1920, based on the target brightness adjustment intensity, brightness adjustment is performed on the target local region. At step S1930, correlation between semantic features of respective semantic categories in the first image is acquired. At step S1940, brightness adjustment is performed on the other local regions of the first image except the target local region based on the correlation. Relevant details involved in the above operation have been described above and will not be repeated here. According to the method shown in FIG. 19, since the correlation between the semantic features of the respective semantic categories in the first image is acquired after the brightness adjustment of the target local region in the first image based on the target brightness adjustment intensity, and the brightness adjustment is performed on the other local regions of the first image except the target local region based on the correlation, it may be possible to reduce a disharmony phenomenon between the target local region and the other local regions after the brightness adjustment of the target local region, which makes the adjusted image more natural, thereby improving the quality of the brightness adjusted image.

Figure 20:
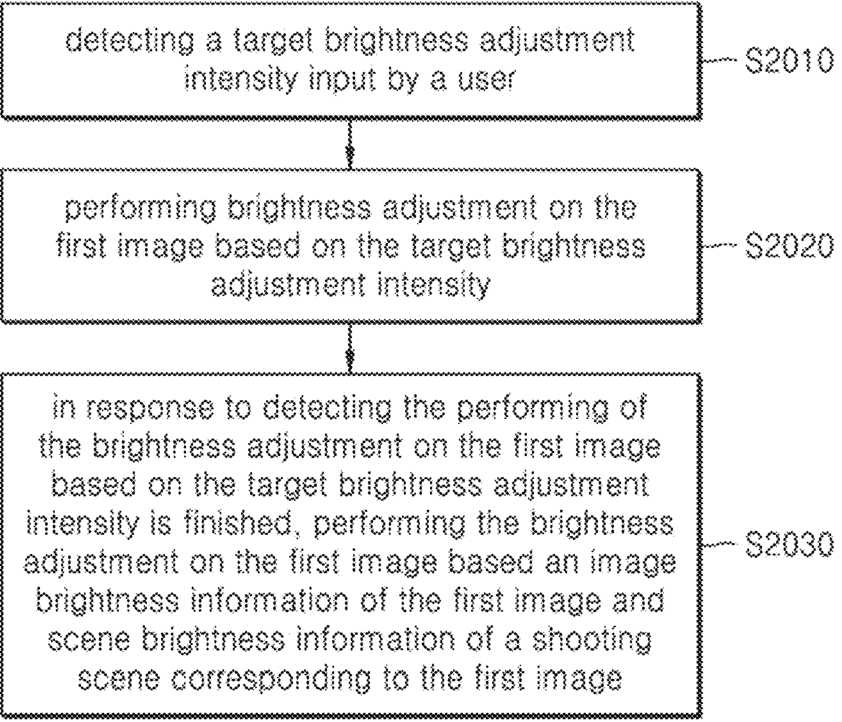
FIG. 20 is a flowchart of a method performed by an electronic device according to yet another exemplary embodiment of the present disclosure.

FIG. 20 is a flowchart of a method performed by an electronic device according to yet another exemplary embodiment of the present disclosure. Referring to FIG. 20, at step S2010, a target brightness adjustment intensity input by the user is detected. For example, the target brightness adjustment intensity may be a brightness adjustment intensity corresponding to a global region of the first image or may be a brightness adjustment intensity corresponding to a target local region in the first image. At step S2020, brightness adjustment is performed on the first image based on the target brightness adjustment intensity. If the target brightness adjustment intensity is the brightness adjustment intensity corresponding to the global region of the first image, at step S2020, the brightness adjustment may be performed on the global region of the first image. If the target brightness adjustment intensity is the brightness adjustment intensity corresponding to the target local region in the first image, at step S2020, the brightness adjustment may be performed on the target local region in the first image. For example, the brightness adjustment may be performed on the first image in accordance with the global brightness adjustment method shown in FIG. 18 and the local brightness adjustment method shown in FIG. 19. At step S2030, in response to detecting that the performing of the brightness adjustment on the first image based on the target brightness adjustment intensity is finished, the brightness adjustment is performed on the first image based on image brightness information of the first image and scene brightness information of a shooting scene corresponding to the first image. For example, automatic brightness adjustment may be performed on the first image using the brightness adjustment method shown in FIG. 1 to obtain a brightness enhanced image of the first image. According to the method shown in FIG. 20, a higher quality brightness enhanced image can be obtained with fewer user operations.

According to an embodiment of the present disclosure, a low brightness image (e.g. an input image, an input low brightness image) may be reduced to a high brightness image while maintaining the overall contrast and color saturation of the image. A low brightness image is an image obtained (e.g. captured, taken, acquired) in a low brightness environment, where the image brightness is dark and the details of the low brightness regions of the image are not clear. In contrast, a high brightness image is an image with high brightness, clear details in the low brightness regions of the image, and appropriate brightness in the high brightness regions of the image, with no overexposure, while maintaining the proper contrast and color saturation of the image as a whole.

FIG. 21 is a schematic diagram illustrating an example of an image brightness adjustment architecture according to one or more embodiments of the present disclosure. As shown in FIG. 21, for an input low brightness image (i.e. first image 210), the global manual brightness adjustment 2110 is first performed based on the brightness adjustment intensity input by the user 245. Then, the local brightness adjustment 2120 may be performed on the global brightness adjusted image 250 based on the user specified local region and the brightness adjustment intensity of the local region. In an embodiment, the local brightness adjustment 2120 can be performed directly. Finally, automatic brightness adjustment 2130 is performed on the image after manual coarse brightness adjustment to obtain a high brightness image 1530 with suitable brightness.

Figure 22:
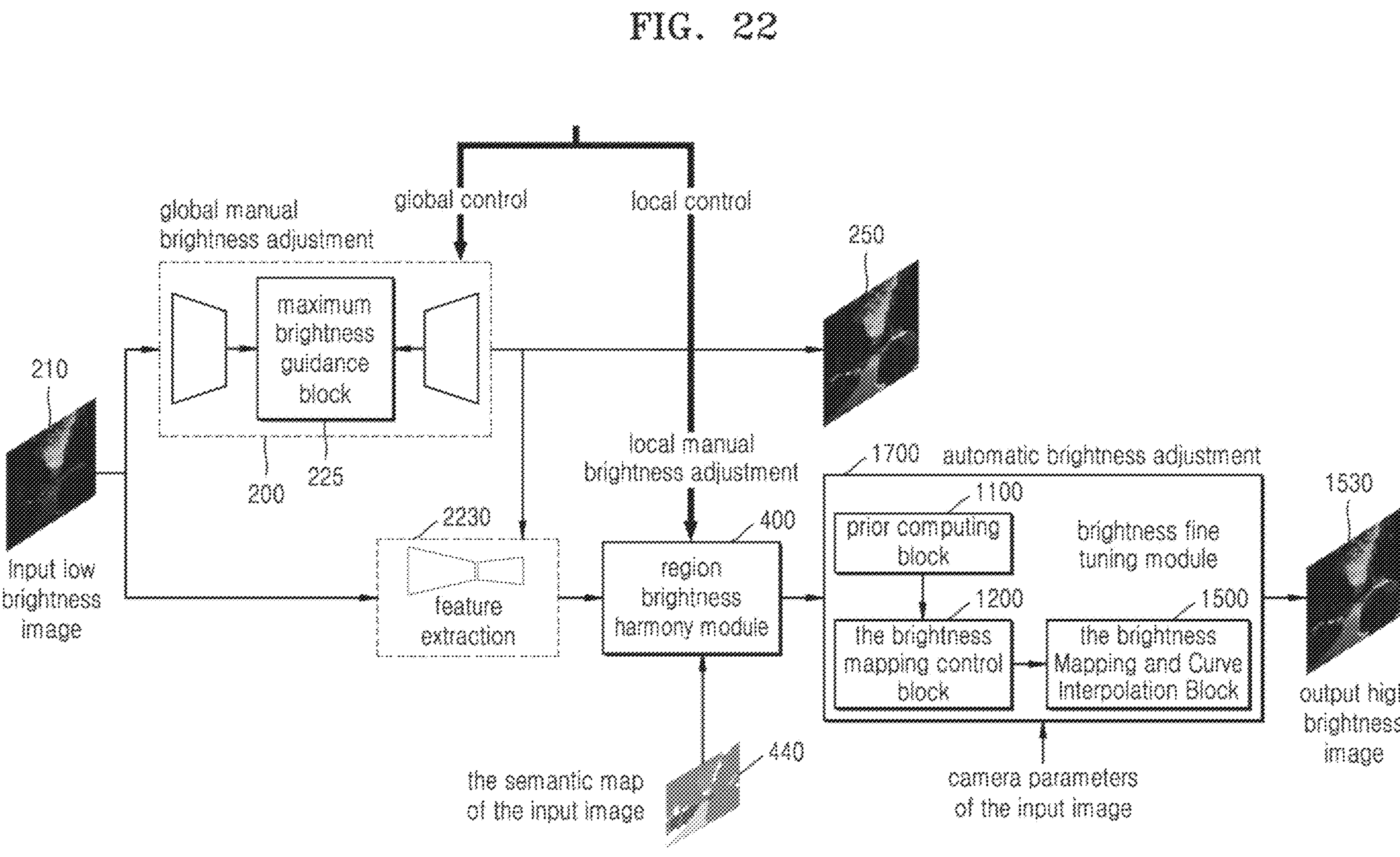
FIG. 22 is a schematic diagram illustrating a detailed structure of an image brightness adjustment architecture according to an embodiment of the present disclosure.
Figure 23:
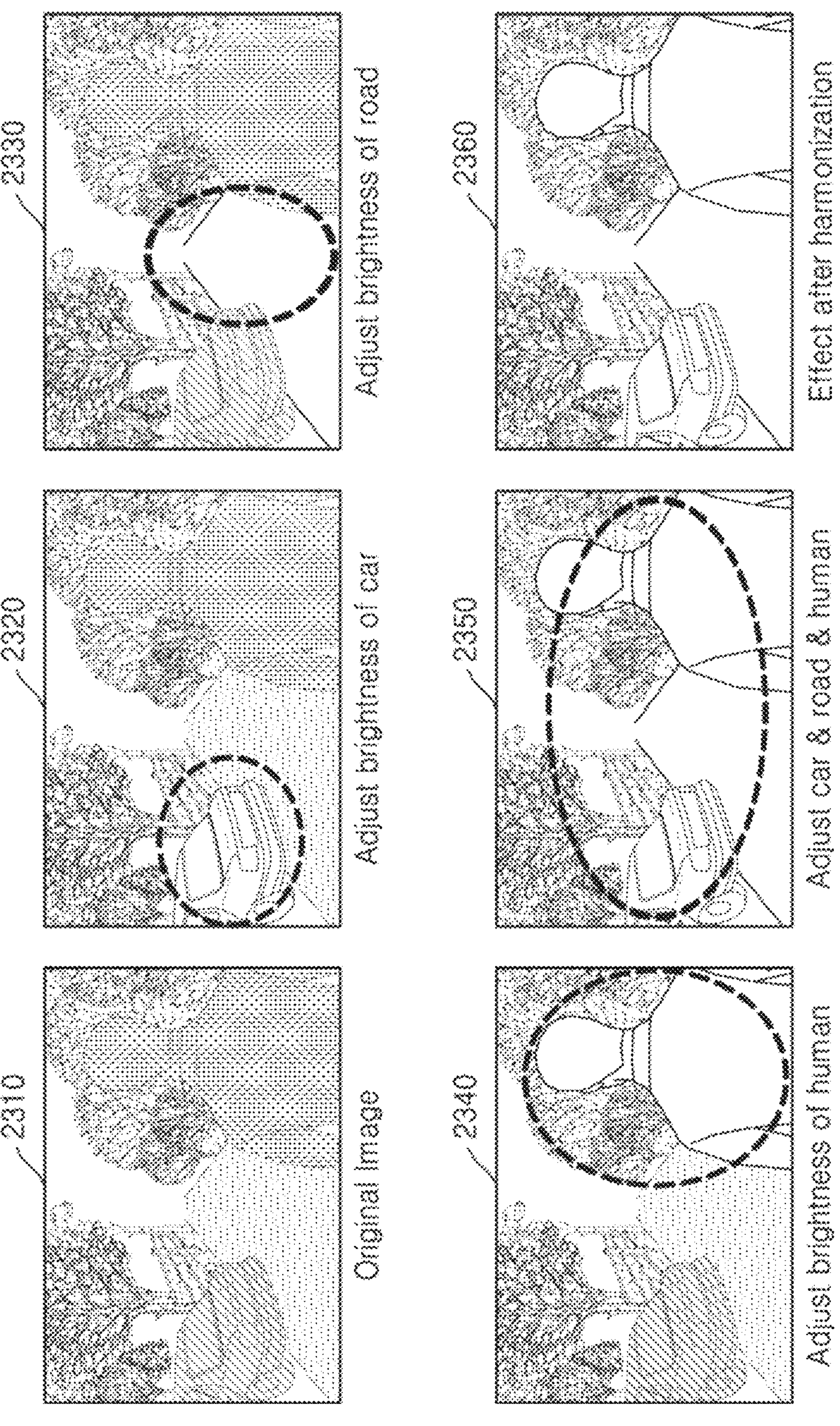
FIG. 23 is a schematic diagram illustrating a local brightness adjustment effect according to an embodiment of the present disclosure.

FIG. 22 is a schematic diagram illustrating a detailed structure of an image brightness adjustment architecture according to one or more embodiments of the present disclosure. As shown in FIG. 22, after a low brightness image 210 is input, the global manual brightness adjustment 2110 may be performed under the user's control 245, for example, the global brightness adjustment may be performed utilizing the global manual brightness adjustment module 200 including the maximum brightness guidance block 225 as mentioned above to output a coarsely adjusted high brightness image. In an embodiment, the local brightness adjustment 2120 may be performed under the user's control 245, for example, the local brightness adjustment 2120 may be performed by a region brightness harmony module 400, based on the image features obtained by performing feature extraction 2140 on the low brightness image 210 and the semantic map of the input image 440, according to the local brightness adjustment method described above. By performing the inter-region harmonization and the intra-region harmonization as described above, a better brightness adjustment effect can be obtained. For example, as shown in FIG. 23, the original image 2310 is obtained. Then, the brightness of the car in the original image may be selected to be adjusted first 2320, and after the brightness of the car is adjusted, the inter-region harmonization 2350 may be performed to adjust the brightness of the road around the car 2330 as well as the brightness of the human 2340, and finally the intra-region harmonization 2360 may be performed to adjust the brightness of the car, the road, and the human, so that ultimately, a harmonized and more natural-looking brightness adjustment effect may be obtained. In an embodiment, further local brightness adjustment can also be performed on the image after the global brightness adjustment.

The manual global and local image brightness adjustments described above may be realized to coarsely adjust the image, and an overall suitable brightness enhanced image can be quickly obtained. On this basis, the automatic brightness adjustment can be performed using the method shown in FIG. 1 mentioned above. According to one or more embodiments, a brightness fine tuning module 1700 for performing the method shown in FIG. 1 may include the prior computing block 1100, the brightness mapping control block 1200, the brightness mapping and curve interpolation block 1500 referred to above, output high brightness image 1530 as an output, and the details of the operations performed by the above blocks have all been described above in the description with reference to FIG. 1, and will not be repeated herein.

Figure 24:
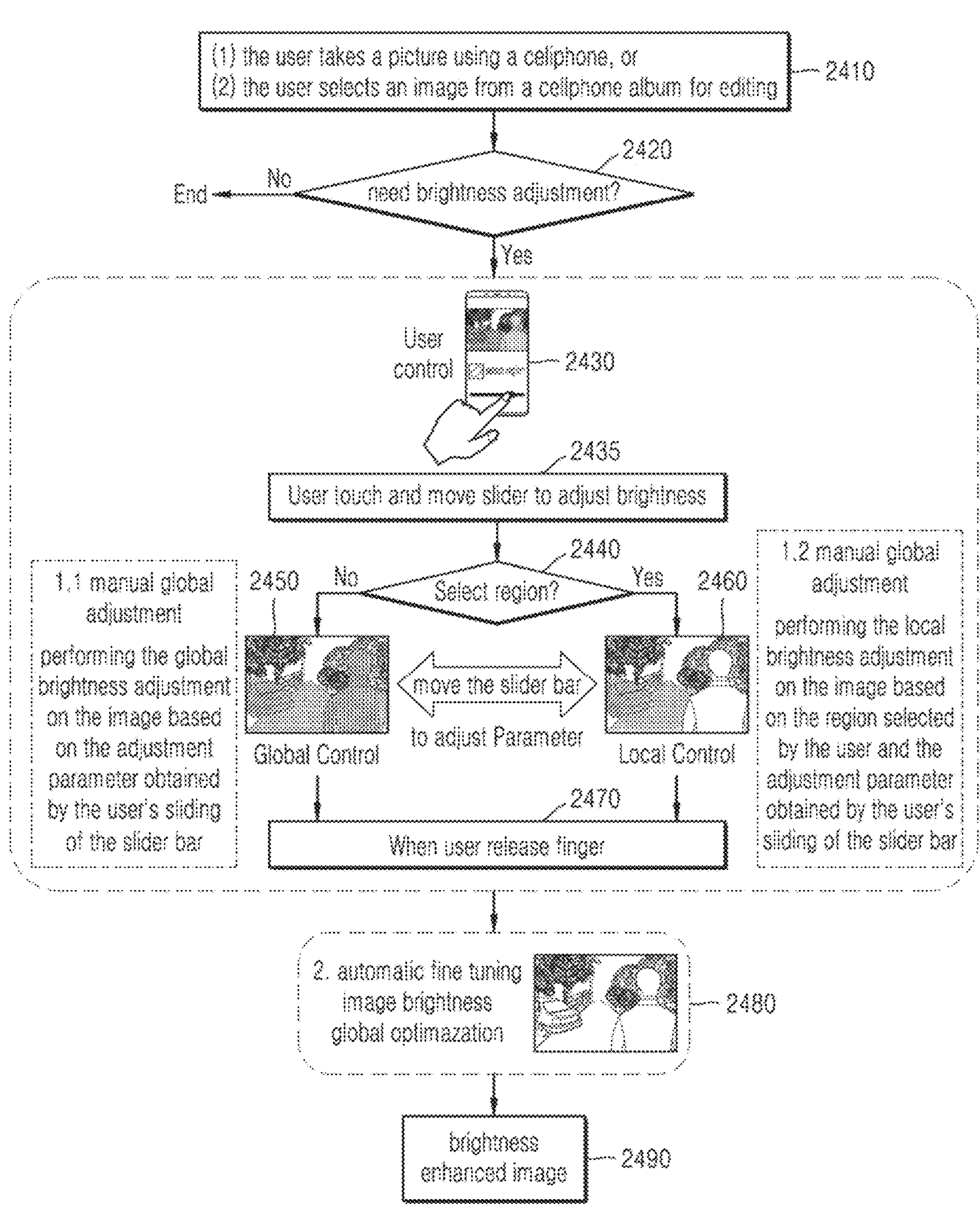
FIG. 24 is a schematic diagram illustrating an example of an overall process of image brightness adjustment according to an embodiment of the present disclosure.

FIG. 24 illustrates an example of an overall flow of image brightness adjustment according to an embodiment of the present disclosure.

As shown in FIG. 24, first, an input image is acquired. For example, at 2410, the input image may be acquired when the user takes a picture using a cellphone, or when the user selects an image from a cellphone album for editing. Subsequently, at 2420, it may be determined whether the image needs the brightness adjustment, and if not, it ends. If the brightness adjustment is needed, an image brightness adjustment interface may be provided for the input image. At 2430, the user may control the brightness adjustment method and the brightness adjustment intensity through the image brightness adjustment interface. For example, at 2435, the user may touch and move a slider on the brightness adjustment interface to adjust the brightness. When the user slides the brightness adjustment slider bar, the brightness adjustment scheme of one or more embodiments of the present disclosure is activated. As the user slides the sliding bar, the input adjustment parameter (target brightness adjustment intensity) may be determined. In addition, at 2440, it may be determined whether the user has selected the region desired to be adjusted via the image brightness adjustment interface. If no region is selected, as illustrated at 2450, the global brightness adjustment may be performed on the image based on the adjustment parameter determined by the user's sliding of the slider bar. If the region is selected, as illustrated at 2460, the local brightness adjustment may be performed on the image based on the region selected by the user and the adjustment parameter obtained by the user's sliding of the sliding bar. When the user selects the target local region for adjustment, the target local region can be selected by clicking on the target local region or pointing out the outline of the target local region. According to one or more embodiments of the present disclosure, either the global brightness adjustment or the local brightness adjustment may utilize an artificial intelligence network. For example, the artificial intelligence network may be utilized in the global brightness adjustment to predict the maximum brightness residual map. As an example, the artificial intelligence network may be utilized in the local brightness adjustment for semantic awareness enhancement, inter-region harmony, and intra-region harmony. Finally, when the user releases the finger that touches the slider (i.e. at 2470), upon detection of this action, at 2480, the automatic brightness adjustment scheme according to one or more embodiments of the present disclosure may be activated, can automatically fine tune the coarse tuned image after the global brightness adjustment or the local brightness adjustment to generate a brightness enhanced image 2490 of the input image. It should be noted that the process shown in FIG. 24 is only one or more examples, and the present disclosure is not limited to proceeding with the process shown in FIG. 24, for example, the global brightness adjustment, the local brightness adjustment, and the automatic brightness adjustment may be performed sequentially, and in fact, the above three brightness adjustments may be performed in any order.

The brightness adjustment scheme according to one or more embodiments of the present disclosure may be applied in a variety of scenarios, for example, applied in an album application, applied when photographing with a cellphone, and the like.

Figure 25:
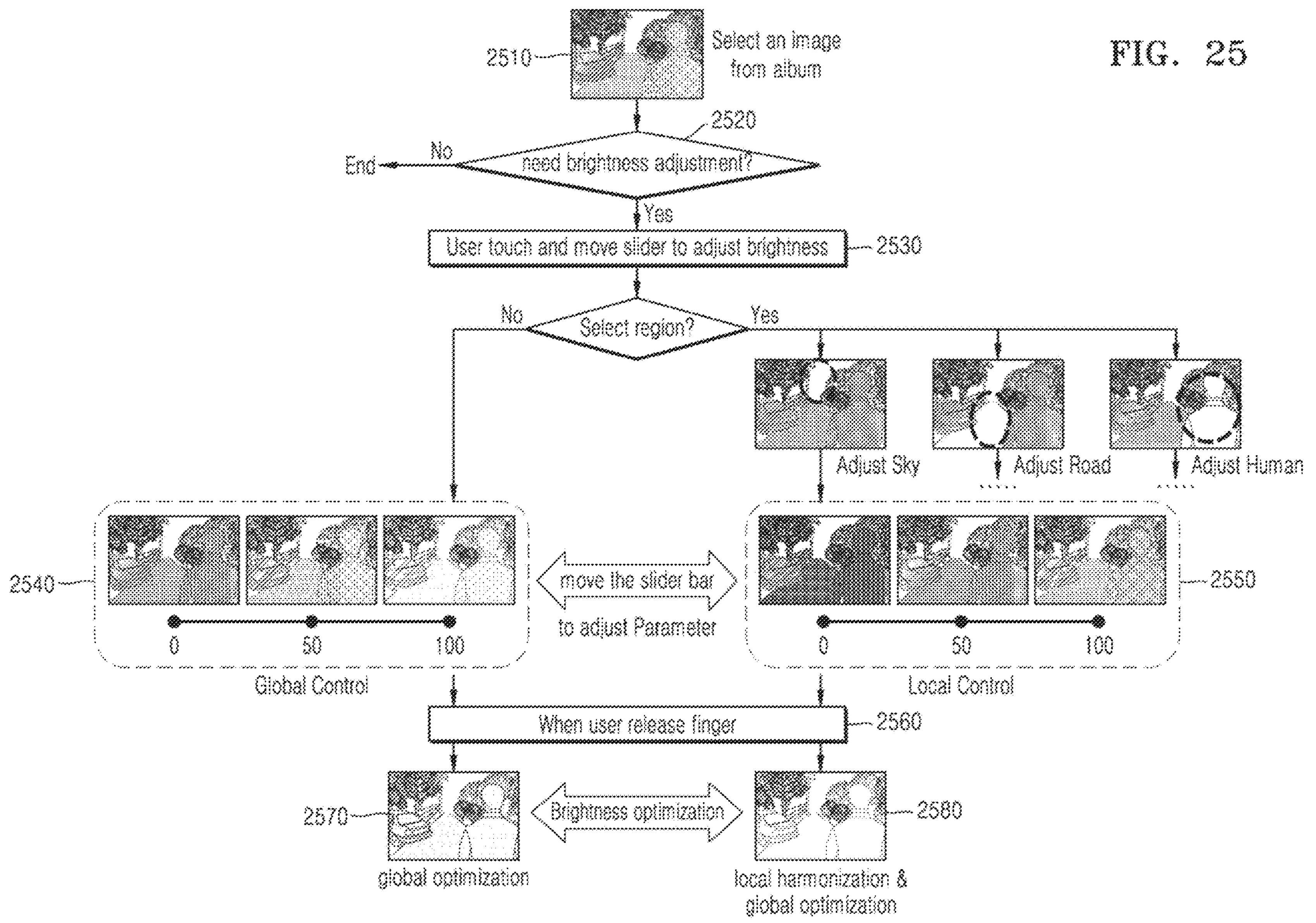
FIG. 25 is a schematic diagram of using a brightness adjustment scheme according to an embodiment of the present disclosure in an album application.

FIG. 25 is a schematic diagram of using the brightness adjustment scheme according to one or more embodiments of the present disclosure in an album application. First, at 2510, an image is selected from the album application, and subsequently, at 2520, it is determined whether the image needs the brightness adjustment, and if not, it ends. If the brightness adjustment is required, as illustrated at 2530, the user can touch and move the slider bar, and according to the movement of the slider bar, an adjustment parameter (target brightness adjustment intensity) can be determined for the brightness adjustment. Subsequently, if the user does not select a region, as illustrated at 2540, the global brightness adjustment is performed according to the adjustment parameter. If the user selects a region as illustrated at 2550, the local brightness adjustment of the selected region is performed according to the adjustment parameter. For example, the sky, the road, and the person in the image can be adjusted sequentially according to the user's selection, and ultimately a harmonized local brightness adjustment result is generated. Finally, at 2560, when the user releases the finger touching the slider, the brightness optimization can be performed automatically using the automatic brightness adjustment scheme mentioned above. If the global brightness adjustment is performed previously, the global brightness optimization may be automatically performed to obtain a globally optimized brightness enhanced image 2570. If the local brightness adjustment is performed previously, the global brightness optimization may be automatically performed to ultimately obtain a locally harmonized and globally optimized brightness enhanced image 2580.

FIG. 26 is a schematic diagram of operations of using the brightness adjustment scheme according to one or more embodiments of the present disclosure in an album application. As shown in FIG. 26, for example, the album application may be launched by clicking on the album application icon on the user interface (① in FIG. 26) and an image desired to be adjusted is selected (② in FIG. 26). Subsequently, the user may click an edit button on the image display interface (③ in the upper part of FIG. 26), and may next proceed to select the brightness adjustment button (④ in the upper part of FIG. 26), and when the brightness adjustment button is selected, the global brightness adjustment of the present disclosure may be applied to obtain a global brightness adjusted image of the selected image. For example, images before and after the adjustment can be displayed in comparison (⑤ in the upper part of FIG. 26). In an embodiment, the user may perform operations to perform the automatic brightness adjustment on the selected image. For example, the user may further select a menu (④ in the bottom part of FIG. 26) for the automatic brightness adjustment by clicking on a function menu (③ in the bottom part of FIG. 26), and when the menu is selected, the automatic brightness adjustment scheme of the present disclosure may be automatically applied to perform the automatic brightness adjustment on the selected image. Finally, for example, the image before the adjustment and the image after the adjustment can be displayed in comparison (⑤ in the bottom part of FIG. 26).

Figure 27:
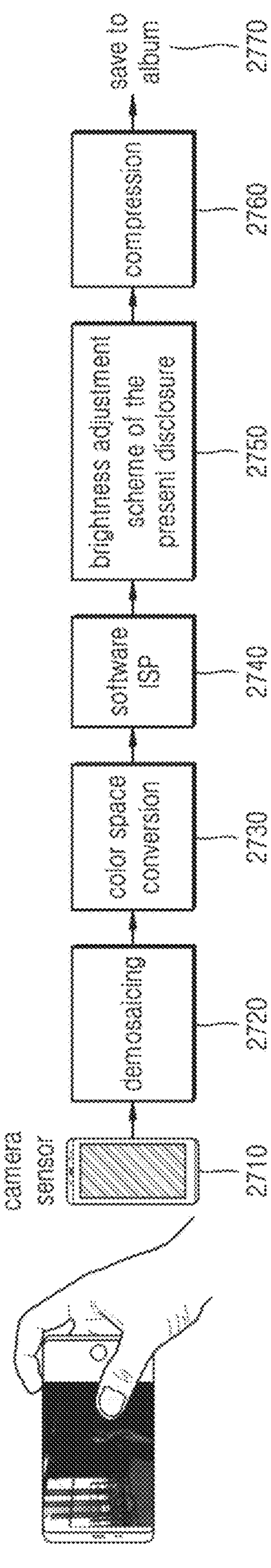
FIG. 27 is a schematic diagram of using a brightness adjustment scheme according to an embodiment of the present disclosure while photographing with a camera.

FIG. 27 is a schematic diagram of using a brightness adjustment scheme according to an embodiment of the present disclosure while photographing with a camera.

For example, while photographing with a camera, after an image is captured by a camera sensor 2710 and, for example, demosaicing 2720, color space conversion 2730, and a software ISP (Image Signal Processor) 2740 may be performed, the brightness adjustment scheme according to one or more embodiments of the present disclosure 2750 may be applied to perform automatic brightness adjustment 2110, and then, the adjusted image may be compressed 2760 and saved in an album 2770.

The above content only briefly describes application examples of the brightness adjustment scheme according to the embodiments of the present disclosure by taking the album application and photographing with a camera as examples, however, the brightness adjustment scheme according to the embodiments of the present disclosure is not limited to being applied to the above two scenarios, but can be applied to any scenario in which brightness adjustment is required to be performed.

In the foregoing, the method performed by the electronic device according to the embodiments of the present disclosure has been described. In the following, the electronic device according to an embodiment of the present disclosure is briefly described.

Figure 28:
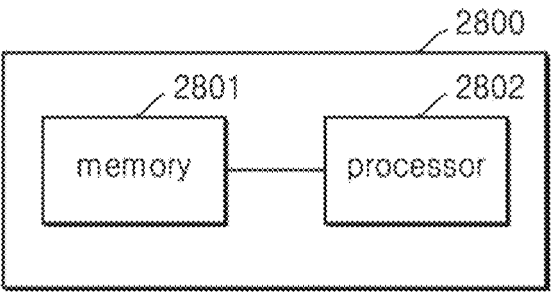
FIG. 28 is a block diagram illustrating an electronic device according to an embodiment of the present disclosure.

FIG. 28 is a block diagram illustrating an electronic device according to one or more embodiments of the present disclosure. Referring to FIG. 28, an electronic device 2800 may include a memory 2801 and a processor 2802, wherein the processor 2802 is coupled with the memory 2801 and configured to perform any of the methods described above.

An embodiment of the present disclosure may also provide an electronic device including at least one processor, which optionally may also include at least one transceiver and/or at least one memory coupled to the at least one processor, the at least one processor is configured to perform the steps of the methods provided in any optional embodiment of the present disclosure.

Figure 29:
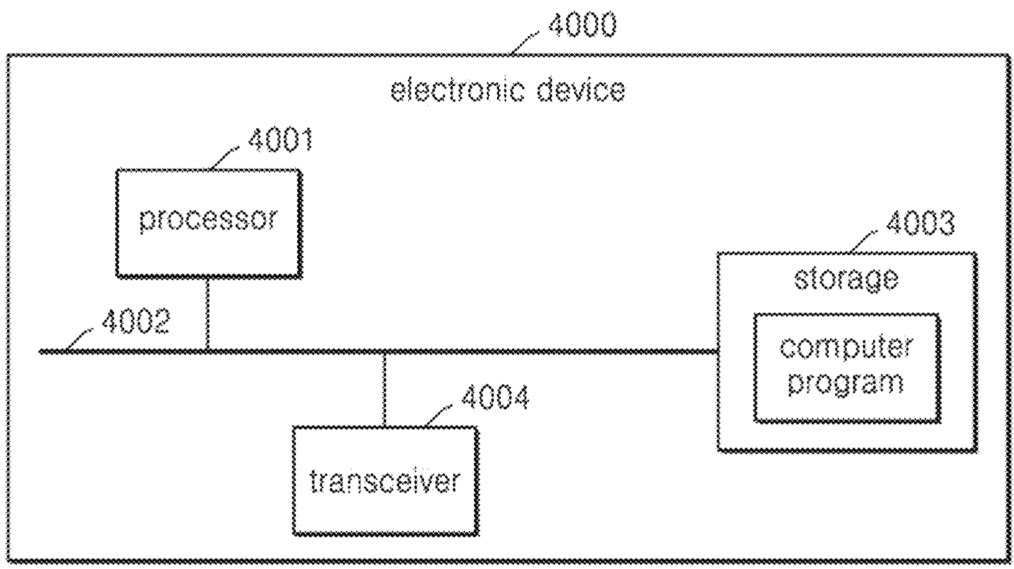
FIG. 29 is a structure schematic diagram illustrating an electronic device according to an embodiment of the present disclosure.

FIG. 29 shows a schematic diagram of the structure of an electronic apparatus to which the embodiments of the disclosure is applicable. As shown in FIG. 29, the electronic apparatus 4000 shown in FIG. 29 includes a processor 4001 and a memory 4003. Wherein, the processor 4001 is connected to the memory 4003, such as through a bus 4002. The electronic apparatus 4000 may include a transceiver 4004, which can be used for data interaction between this electronic apparatus and other electronic apparatus, such as data transmission and/or data reception. It should be noted that in practical applications, each of the processor 4001, memory 4003, and transceiver 4004 is not limited to one, and the structure of the electronic apparatus 4000 does not constitute a limitation of the embodiments of the present disclosure. This electronic apparatus may be a first network node, a second network node, or a third network node.

The processor 4001 can be a CPU (Central Processing Unit), a general-purpose processor, a DSP (Digital Signal Processor), an ASIC (Application Specific Integrated Circuit), an FPGA (Field Programmable Gate Array), or any other programmable logic device, transistor logic device, hardware component, or any combination thereof. It can implement or execute various exemplary logical blocks, modules, and circuits described in conjunction with the content disclosed by the present disclosure. The processor 4001 may also be a combination of computing functions, such as a combination containing one or more microprocessor, a combination of DSP and microprocessor, etc.

The bus 4002 may include a path to transmit information between the aforementioned components. The bus 4002 can be a PCI (Peripheral Component Interconnect) bus or an EISA (Extended Industry Standard Architecture) bus. The bus 4002 can be classified as address bus, data bus, control bus, etc. For ease of representation, only one thick line is used in FIG. 29, but it does not mean that there is only one bus or one type of bus.

The memory 4003 can be ROM (Read Only Memory) or other types of static storage devices that can store static information and instructions, RAM (Random Access Memory) or other types of dynamic storage devices that can store information and instructions, or EEPROM (Electrically Erasable Programmable Read Only Memory), CD-ROM (Compact Disc Read Only Memory) or other disc storage, optical disc storage (including compressed discs, laser discs, optical discs, digital universal discs, Blu-ray discs, etc.), disk storage media, other magnetic storage devices, or any other media that can be used to carry or store computer programs and can be read by a computer, are not limited herein.

The memory 4003 is used to store computer programs or executable instructions executing the embodiments of the present disclosure, and the execution is controlled by processor 4001. The processor 4001 is used to execute computer programs or executable instructions stored in memory 4003 to implement the steps shown in the aforementioned method embodiments.

In one or more embodiments of the present disclosure, there is provided a computer-readable storage medium storing computer programs or instructions, wherein the computer programs or instructions, when being executed by at least one processor, may execute or implement the steps and corresponding contents of the aforementioned method embodiments.

In one or more embodiments of the present disclosure, there is further provided a computer program product, including computer programs, when being executed by a processor, may execute or implement the steps and corresponding contents of the aforementioned method embodiments.

The terms "first", "second", "third", "fourth", "1", "2" and the like (if exists) in the description and claims of the present disclosure and the above drawings are used to distinguish similar objects, and need not be used to describe a specific order or sequence. It should be understood that data used as such may be interchanged in appropriate situations, so that the embodiments of the present disclosure described here may be implemented in an order other than the illustration or text description.

It should be understood that although each operation step is indicated by arrows in the flowcharts of the embodiments of the present disclosure, an implementation order of these steps is not limited to an order indicated by the arrows. Unless explicitly stated herein, in some implementation scenarios of the embodiments of the present disclosure, the implementation steps in the flowcharts may be executed in other orders according to requirements. In addition, some or all of the steps in each flowchart may include a plurality of sub steps or stages, based on an actual implementation scenario. Some or all of these sub steps or stages may be executed at the same time, and each sub step or stage in these sub steps or stages may also be executed at different times. In scenarios with different execution times, an execution order of these sub steps or stages may be flexibly configured according to requirements, which is not limited by the embodiment of the present disclosure.

According to an embodiment of the disclosure, the performing the brightness adjustment may include determining a range of an adjustment intensity parameter corresponding to the first image based on the image brightness information and the scene brightness information. The performing the brightness adjustment may include performing the global brightness adjustment based on the range of the adjustment intensity parameter.

According to an embodiment of the disclosure, the performing the brightness adjustment may include determining a range of an adjustment intensity parameter corresponding to the first image based on the image brightness information and the scene brightness information. The performing the brightness adjustment may include performing the brightness adjustment on the first image based on the range of the adjustment intensity parameter.

According to an embodiment of the disclosure, the determining the range of the adjustment intensity parameter corresponding to the first image based on the image brightness information and the scene brightness information may include determining a brightness range of the first image based on image features of the first image. The determining the range of the adjustment intensity parameter corresponding to the first image based on the image brightness information and the scene brightness information may include determining the range of the adjustment intensity parameter based on the brightness range, the image brightness information, and the scene brightness information.

According to an embodiment of the disclosure, the determining the brightness range of the first image based on the image features of the first image may include determining a maximum brightness feature and a minimum brightness feature of the first image using maximum pooling and minimum pooling, respectively, based on the image features of the first image. The determining of the range of the adjustment intensity parameter based on the brightness range, the image brightness information, and the scene brightness information may include determining a maximum brightness adjustment intensity parameter corresponding to the first image based on the maximum brightness feature, the image brightness information, and the scene brightness information. The determining of the range of the adjustment intensity parameter based on the brightness range, the image brightness information, and the scene brightness information may include determining a minimum brightness adjustment intensity parameter corresponding to the first image based on the minimum brightness feature, the image brightness information, and the scene brightness information.

According to an embodiment of the disclosure, the range of the adjustment intensity parameter may include a maximum brightness adjustment intensity parameter and a minimum brightness adjustment intensity parameter. The performing the brightness adjustment based on the range of the adjustment intensity parameter may include, for the local region, fusing the maximum brightness adjustment intensity parameter and the minimum brightness adjustment intensity parameter corresponding to the local region based on a brightness value of the local region, to obtain a fused adjustment intensity parameter. The performing the brightness adjustment based on the range of the adjustment intensity parameter may include adjusting brightness of the local region based on the fused adjustment intensity parameter.

According to an embodiment of the disclosure, the performing the brightness adjustment based on the range of the adjustment parameter may include, for each local region of the first image, fusing the maximum brightness adjustment intensity parameter and the minimum brightness adjustment intensity parameter corresponding to the local region based on a brightness value of the local region. The performing the brightness adjustment based on the range of the adjustment intensity parameter may include adjusting brightness of the local region based on the fused adjustment intensity parameter.

According to an embodiment of the disclosure, the fusing the maximum brightness adjustment intensity parameter and the minimum brightness adjustment intensity parameter corresponding to the local region based on the brightness value of the local region, and the adjusting of the brightness of the local region based on the fused adjustment intensity parameter, may include determining a local brightness adjustment intensity parameter corresponding to the local region based on image features of the local region. The fusing the maximum brightness adjustment intensity parameter and the minimum brightness adjustment intensity parameter corresponding to the local region based on the brightness value of the local region, and the adjusting of the brightness of the local region based on the fused adjustment intensity parameter, may include determining, based on the brightness value of the local region, a first weight of the maximum brightness adjustment intensity parameter, a second weight of the minimum brightness adjustment intensity parameter, and a third weight of the local brightness adjustment intensity parameter. The fusing the maximum brightness adjustment intensity parameter and the minimum brightness adjustment intensity parameter corresponding to the local region based on the brightness value of the local region, and the adjusting of the brightness of the local region based on the fused adjustment intensity parameter, may include performing weighted fusion on the maximum brightness adjustment intensity parameter, the minimum brightness adjustment intensity parameter, and the local brightness adjustment intensity parameter using the first weight, the second weight, and the third weight to acquire a fused local brightness adjustment intensity parameter corresponding to the local region. The fusing the maximum brightness adjustment intensity parameter and the minimum brightness adjustment intensity parameter corresponding to the local region based on the brightness value of the local region, and the adjusting of the brightness of the local region based on the fused adjustment intensity parameter, may include adjusting the brightness of the local region based on the fused local brightness adjustment intensity parameter.

The fusing the maximum brightness adjustment intensity parameter and the minimum brightness adjustment intensity parameter corresponding to the local region based on the brightness value of the local region, and the adjusting of the brightness of the local region based on the fused adjustment intensity parameter, may include determining, based on the brightness value of the local region, a first weight of the maximum brightness adjustment intensity parameter, a second weight of the minimum brightness adjustment intensity parameter, and a third weight of the local brightness adjustment intensity parameter corresponding to the local region. The fusing the maximum brightness adjustment intensity parameter and the minimum brightness adjustment intensity parameter corresponding to the local region based on the brightness value of the local region, and the adjusting of the brightness of the local region based on the fused adjustment intensity parameter, may include performing weighted fusion on the maximum brightness adjustment intensity parameter, the minimum brightness adjustment intensity parameter, and the local brightness adjustment intensity parameter using the first weight, the second weight, and the third weight to acquire a brightness adjustment intensity parameter corresponding to the local region. The fusing the maximum brightness adjustment intensity parameter and the minimum brightness adjustment intensity parameter corresponding to the local region based on the brightness value of the local region, and the adjusting of the brightness of the local region based on the fused adjustment intensity parameter, may include adjusting the brightness of the local region based on the brightness adjustment intensity parameter corresponding to the local region.

According to an embodiment of the disclosure, the acquiring the image brightness information of the first image and the scene brightness information of the shooting scene corresponding to the first image may include performing global average pooling on the first image to acquire the image brightness information. The acquiring the image brightness information of the first image and the scene brightness information of the shooting scene corresponding to the first image may include acquiring the shooting parameter information of the first image. The acquiring the image brightness information of the first image and the scene brightness information of the shooting scene corresponding to the first image may include acquiring the scene brightness information based on the shooting parameter information.

According to an embodiment of the disclosure, the acquiring the scene brightness information based on the shooting parameter information may include determining a camera metering exposure value based on the shooting parameter information. The acquiring the scene brightness information based on the shooting parameter information may include acquiring the scene brightness information based on the camera metering exposure value.

According to an embodiment of the disclosure, the acquiring the scene brightness information based on the shooting parameter information may include determining a normalized exposure value based on the shooting parameter information. The acquiring the scene brightness information based on the camera metering exposure value, may include acquiring the scene brightness information based on the camera metering exposure value and the normalized exposure value.

According to an embodiment of the disclosure, the shooting parameter information may include at least one of an aperture value, an exposure time, ISO, a baseline exposure value.

According to an embodiment of the disclosure, the adjusting the brightness of the local region based on the fused local brightness adjustment intensity parameter, may include, for a center pixel in the local region, adjusting the brightness of the center pixel using a center brightness adjustment intensity parameter corresponding to the center pixel from the fused local brightness adjustment intensity parameter. The adjusting the brightness of the local region based on the fused local brightness adjustment intensity parameter, may include, for a non-center pixel in the local region, adjusting the brightness of the non-center pixel based on the fused local brightness adjustment intensity parameter and an adjacent brightness adjustment intensity parameter corresponding to an adjacent local region adjacent to the local region.

According to an embodiment of the disclosure, the adjusting the brightness of the local region based on the brightness adjustment intensity parameter corresponding to the local region, may include, for a center pixel in the local region, adjusting the brightness of the center pixel using the brightness adjustment intensity parameter corresponding to the center pixel among the brightness adjustment intensity parameter corresponding to the local region. The adjusting of the brightness of the local region based on the brightness adjustment intensity parameter corresponding to the local region, may include, for a non-center pixel in the local region, adjusting the brightness of the non-center pixel based on the brightness adjustment intensity parameter corresponding to the local region and the brightness adjustment intensity parameter corresponding to an adjacent local region of the local region.

According to an embodiment of the disclosure, the adjusting the brightness of the non-center pixel based on the fused local brightness adjustment intensity parameter and the adjacent brightness adjustment intensity parameter, may include mapping the fused local brightness adjustment intensity parameter and the adjacent brightness adjustment intensity parameter to be at a same spatial location. The adjusting the brightness of the non-center pixel based on the fused local brightness adjustment intensity parameter and the adjacent brightness adjustment intensity parameter, may include applying the fused local brightness adjustment intensity parameter and the adjacent brightness adjustment intensity parameter, respectively, to acquire brightness values of the non-center pixel adjusted using different brightness adjustment intensity parameters. The adjusting the brightness of the non-center pixel based on the fused local brightness adjustment intensity parameter and the adjacent brightness adjustment intensity parameter, may include performing bilinear interpolation on the brightness values adjusted using the different brightness adjustment intensity parameters to acquire a final brightness value of the non-center pixel.

According to an embodiment of the disclosure, the adjusting the brightness of the non-center pixel based on the brightness adjustment intensity parameter corresponding to the local region and the brightness adjustment intensity parameter corresponding to the adjacent local region of the local region, may include mapping the brightness adjustment intensity parameter corresponding to the local region and the brightness adjustment intensity parameter corresponding to the adjacent local region to be at a same spatial location. The adjusting the brightness of the non-center pixel based on the brightness adjustment intensity parameter corresponding to the local region and the brightness adjustment intensity parameter corresponding to the adjacent local region of the local region, may include applying the brightness adjustment intensity parameter corresponding to the local region and the adjacent brightness adjustment intensity parameter corresponding to the adjacent local region, respectively, to acquire brightness values of the non-center pixel adjusted using different brightness adjustment intensity parameters. The adjusting the brightness of the non-center pixel based on the brightness adjustment intensity parameter corresponding to the local region and the brightness adjustment intensity parameter corresponding to the adjacent local region of the local region, may include performing bilinear interpolation on the brightness values adjusted using the different brightness adjustment intensity parameters to acquire a final brightness value of the non-center pixel.

According to an embodiment, the method may include detecting a target brightness adjustment intensity input by a user. The method may include performing the global brightness adjustment based on the target brightness adjustment intensity. The method may include performing the brightness adjustment on the first image based on the target brightness adjustment intensity.

The target brightness adjustment intensity may correspond to a global region of the first image. The performing of the global brightness adjustment based on the target brightness adjustment intensity may include acquiring brightness statistical information of the first image. The performing of the global brightness adjustment based on the target brightness adjustment intensity may include determining a maximum brightness adjustment intensity parameter corresponding to the first image based on the brightness statistical information. The performing of the global brightness adjustment based on the target brightness adjustment intensity may include performing the global brightness adjustment based on the maximum brightness adjustment intensity parameter and the target brightness adjustment intensity.

The target brightness adjustment intensity may be a brightness adjustment intensity corresponding to a global region of the first image. The performing of the brightness adjustment on the first image based on the target brightness adjustment intensity may include acquiring brightness statistical information of the first image. The performing of the brightness adjustment on the first image based on the target brightness adjustment intensity, may include performing the brightness adjustment on the first image based on the maximum brightness adjustment intensity parameter and the target brightness adjustment intensity.

The determining the maximum brightness adjustment intensity parameter corresponding to the first image based on the brightness statistical information may include performing histogram equalization on the first image to acquire a histogram equalized image corresponding to the first image based on the brightness statistical information. The determining the maximum brightness adjustment intensity parameter corresponding to the first image based on the brightness statistical information may include determining the maximum brightness adjustment intensity parameter corresponding to the first image based on the histogram equalized image.

According to an embodiment, a method performed by an electronic device, may include detecting a target brightness adjustment intensity input by a user, wherein the target brightness adjustment intensity corresponds to a global region of a first image. The method may include acquiring brightness statistical information of the first image. The method may include determining, based on the brightness statistical information, a maximum brightness adjustment intensity parameter corresponding to the first image. The method may include performing brightness adjustment on the first image based on the maximum brightness adjustment intensity parameter and the target brightness adjustment intensity.

According to an embodiment, a method performed by an electronic device, may include: detecting a target brightness adjustment intensity input by a user, wherein the target brightness adjustment intensity corresponds to a target local region in a first image. The method may include performing brightness adjustment on the target local region based on the target brightness adjustment intensity. The method may include performing the local brightness adjustment on the target local region based on the target brightness adjustment intensity. The method may include acquiring correlations between semantic features of respective semantic categories in the first image. The method may include performing brightness adjustment on other local regions of the first image except the target local region based on the correlations. The method may include performing the local brightness adjustment on other local regions of the first image except the target local region based on the correlations.

According to an embodiment, a method performed by an electronic device, may include detecting a target brightness adjustment intensity input by a user. The method may include performing brightness adjustment on a first image based on the target brightness adjustment intensity. The method may include, based on detecting the performing the brightness adjustment on the first image based on the target brightness adjustment intensity is finished, performing the brightness adjustment on the first image based on image brightness information of the first image and scene brightness information of a shooting scene corresponding to the first image. The method may include, performing the brightness adjustment on the first image based on image brightness information of the first image and scene brightness information of a shooting scene corresponding to the first image.

According to an embodiment, a non-transitory computer readable storage medium storing instructions that, when executed by at least one processor, may cause the at least one processor to acquire image brightness information of a first image and scene brightness information of a shooting scene corresponding to the first image. The non-transitory computer readable storage medium storing instructions that, when executed by at least one processor, may cause the at least one processor to perform global brightness adjustment on the first image based on the image brightness information and the scene brightness information. The non-transitory computer readable storage medium storing instructions that, when executed by at least one processor, may cause the at least one processor to perform local brightness adjustment on a local region of the first image based on the image brightness information and the scene brightness information. While certain embodiments of the disclosure has been particularly shown and described, it will be understood that various changes in form and details may be made therein without departing from the spirit and scope of the following claims.

What is claimed is:

1. A method performed by an electronic device, comprising:

acquiring image brightness information of a first image and scene brightness information of a shooting scene corresponding to the first image;

determining a first brightness adjustment intensity parameter and a second brightness adjustment intensity parameter corresponding to the first image based on the image brightness information and the scene brightness information;

for each local region of the first image, obtaining a fused adjustment intensity parameter based on the first brightness adjustment intensity parameter and the second brightness adjustment intensity parameter, and a local brightness value of the local region, wherein the fused adjustment intensity parameter has a different value for each local region; and performing brightness adjustment on the local region of the first image based on the fused adjustment intensity parameter.

2. The method according to claim 1, wherein the performing the brightness adjustment comprises:

determining a range of an adjustment intensity parameter corresponding to the first image based on the image brightness information and the scene brightness information; and performing the brightness adjustment on the first image based on the range of the adjustment intensity parameter, wherein the range of the adjustment intensity parameter includes the first brightness adjustment intensity parameter and the second brightness adjustment intensity parameter.

3. The method according to claim 2, wherein the determining the range of the adjustment intensity parameter corresponding to the first image based on the image brightness information and the scene brightness information comprises:

determining a brightness range of the first image based on image features of the first image; and determining the range of the adjustment intensity parameter based on the brightness range, the image brightness information, and the scene brightness information.

4. The method according to claim 3, wherein the determining the brightness range of the first image based on the image features of the first image comprises:

determining a maximum brightness feature and a minimum brightness feature of the first image using maximum pooling and minimum pooling, respectively, based on the image features of the first image, and wherein the determining of the range of the adjustment intensity parameter based on the brightness range, the image brightness information, and the scene brightness information comprises:

determining a maximum brightness adjustment intensity parameter corresponding to the first image based on the maximum brightness feature, the image brightness information, and the scene brightness information; and determining a minimum brightness adjustment intensity parameter corresponding to the first image based on the minimum brightness feature, the image brightness information, and the scene brightness information.

5. The method according to claim 2, wherein the first brightness adjustment intensity parameter corresponds to a maximum brightness adjustment intensity parameter and the second brightness adjustment intensity parameter corresponds to a minimum brightness adjustment intensity parameter.

6. The method according to claim 5, wherein the fusing the maximum brightness adjustment intensity parameter and the minimum brightness adjustment intensity parameter corresponding to the local region based on the brightness value of the local region, and the adjusting the brightness of the local region based on the fused adjustment intensity parameter, comprises:

determining a local brightness adjustment intensity parameter corresponding to the local region based on image features of the local region;

determining, based on the brightness value of the local region, a first weight of the maximum brightness adjustment intensity parameter, a second weight of the minimum brightness adjustment intensity parameter, and a third weight of the local brightness adjustment intensity parameter corresponding to the local region;

performing weighted fusion on the maximum brightness adjustment intensity parameter, the minimum brightness adjustment intensity parameter, and the local brightness adjustment intensity parameter using the first weight, the second weight, and the third weight to acquire a fused local brightness adjustment intensity parameter corresponding to the local region; and adjusting the brightness of the local region based on the fused local brightness adjustment intensity parameter corresponding to the local region.

7. The method according to claim 1, wherein the acquiring the image brightness information of the first image and the scene brightness information of the shooting scene corresponding to the first image comprises:

performing global average pooling on the first image to acquire the image brightness information;

acquiring a shooting parameter information of the first image; and acquiring the scene brightness information based on the shooting parameter information.

8. The method according to claim 7, wherein the acquiring the scene brightness information based on the shooting parameter information comprises:

determining a camera metering exposure value based on the shooting parameter information; and acquiring the scene brightness information based on the camera metering exposure value.

9. The method according to claim 8, wherein the acquiring the scene brightness information based on the shooting parameter information further comprises:

determining a normalized exposure value based on the shooting parameter information, and wherein the acquiring the scene brightness information based on the camera metering exposure value, comprises:

acquiring the scene brightness information based on the camera metering exposure value and the normalized exposure value.

10. The method according to claim 8, wherein the shooting parameter information comprises at least one of: an aperture value, an exposure time, ISO, a baseline exposure value.

11. The method according to claim 6, wherein the adjusting the brightness of the local region based on the fused local brightness adjustment intensity parameter, comprises:

for a center pixel in the local region, adjusting the brightness of the center pixel using a center brightness adjustment intensity parameter corresponding to the center pixel from the fused local brightness adjustment intensity parameter; and for a non-center pixel in the local region, adjusting the brightness of the non-center pixel based on the fused local brightness adjustment intensity parameter and an adjacent brightness adjustment intensity parameter corresponding to an adjacent local region adjacent to the local region.

12. The method according to claim 11, wherein the adjusting of the brightness of the non-center pixel based on the fused local brightness adjustment intensity parameter and the adjacent brightness adjustment intensity parameter, comprises:

mapping the fused local brightness adjustment intensity parameter and the adjacent brightness adjustment intensity parameter to be at a same spatial location;

applying the fused local brightness adjustment intensity parameter and the adjacent brightness adjustment intensity parameter, respectively, to acquire brightness values of the non-center pixel adjusted using different brightness adjustment intensity parameters; and performing bilinear interpolation on the brightness values adjusted using the different brightness adjustment intensity parameters to acquire a final brightness value of the non-center pixel.

13. The method according to claim 1, further comprising:

detecting a target brightness adjustment intensity input by a user; and performing a global brightness adjustment based on the target brightness adjustment intensity.

14. The method according to claim 13, wherein the target brightness adjustment intensity corresponds to a global region of the first image, and wherein the performing of the brightness adjustment based on the target brightness adjustment intensity, comprises:

acquiring brightness statistical information of the first image;

determining a maximum brightness adjustment intensity parameter corresponding to the first image based on the brightness statistical information; and performing the brightness adjustment on the first image based on the maximum brightness adjustment intensity parameter and the target brightness adjustment intensity.

15. The method according to claim 14, wherein the determining the maximum brightness adjustment intensity parameter corresponding to the first image based on the brightness statistical information, comprises:

performing histogram equalization on the first image to acquire a histogram equalized image corresponding to the first image based on the brightness statistical information; and determining the maximum brightness adjustment intensity parameter corresponding to the first image based on the histogram equalized image.

16. The method according to claim 1, further comprising:

detecting a target brightness adjustment intensity input by a user, wherein the target brightness adjustment intensity corresponds to a global region of the first image;

acquiring brightness statistical information of the first image;

determining, based on the brightness statistical information, a maximum brightness adjustment intensity parameter corresponding to the first image; and performing brightness adjustment on the first image based on the maximum brightness adjustment intensity parameter and the target brightness adjustment intensity.

17. The method according to claim 1, further comprising:

detecting a target brightness adjustment intensity input by a user, wherein the target brightness adjustment intensity corresponds to a target local region in the first image;

performing brightness adjustment on the target local region based on the target brightness adjustment intensity;

acquiring correlations between semantic features of respective semantic categories in the first image; and performing brightness adjustment on other local regions of the first image except the target local region based on the correlations.

18. The method according to claim 1, further comprising:

detecting a target brightness adjustment intensity input by a user;

performing brightness adjustment on the first image based on the target brightness adjustment intensity; and based on detecting the performing of the brightness adjustment on the first image based on the target brightness adjustment intensity is finished, performing the brightness adjustment on the first image based on image brightness information of the first image and scene brightness information of a shooting scene corresponding to the first image.

19. An electronic device, comprising:

a memory storing one or more instructions; and at least one processor coupled to the memory, wherein the at least one processor is configured to execute one or more instructions stored in the memory to cause the electronic device to:

acquiring image brightness information of a first image and scene brightness information of a shooting scene corresponding to the first image;

determining a first brightness adjustment intensity parameter and a second brightness adjustment intensity parameter corresponding to the first image based on the image brightness information and the scene brightness information;

for each local region of the first image, obtaining a fused adjustment intensity parameter based on the first brightness adjustment intensity parameter and the second brightness adjustment intensity parameter, and a local brightness value of the local region, wherein the fused adjustment intensity parameter has a different value for each local region; and performing brightness adjustment on the local region of the first image based on the fused adjustment intensity parameter.

20. A non-transitory computer readable storage medium storing instructions that, when executed by at least one processor, cause the at least one processor to:

acquire image brightness information of a first image and scene brightness information of a shooting scene corresponding to the first image;

determine a first brightness adjustment intensity parameter and a second brightness adjustment intensity parameter corresponding to the first image based on the image brightness information and the scene brightness information;

for each local region of the first image, obtain a fused adjustment intensity parameter based on the first brightness adjustment intensity parameter and the second brightness adjustment intensity parameter, and a local brightness value of the local region, wherein the fused adjustment intensity parameter has a different value for each local region; and perform brightness adjustment on the local region of the first image based on the fused adjustment intensity parameter.

* * * * *